United States Patent
Tran et al.

(10) Patent No.: US 11,122,001 B2
(45) Date of Patent: Sep. 14, 2021

(54) SYSTEMS AND METHODS FOR A PROACTIVE TWO-WAY CONVERSATION

(71) Applicant: LIVEPERSON, INC., New York, NY (US)

(72) Inventors: Linh Tran, Bellevue, WA (US); Neelima Patel, Redmond, WA (US)

(73) Assignee: LIVEPERSON, INC., New York, NY (US)

(*) Notice: Subject to any disclaimer, the term of this patent is extended or adjusted under 35 U.S.C. 154(b) by 0 days.

(21) Appl. No.: 17/123,794

(22) Filed: Dec. 16, 2020

(65) Prior Publication Data

US 2021/0185001 A1    Jun. 17, 2021

Related U.S. Application Data

(60) Provisional application No. 62/948,673, filed on Dec. 16, 2019.

(51) Int. Cl.
*G06F 15/16* (2006.01)
*H04L 12/58* (2006.01)

(52) U.S. Cl.
CPC .............. *H04L 51/26* (2013.01); *H04L 51/06* (2013.01); *H04L 51/18* (2013.01)

(58) Field of Classification Search
CPC .......... H04L 51/26; H04L 51/06; H04L 51/18
See application file for complete search history.

(56) References Cited

U.S. PATENT DOCUMENTS

| 10,630,840 | B1* | 4/2020 | Karp | H04L 63/0807 |
| 2009/0068991 | A1* | 3/2009 | Aaltonen | H04L 67/2819 455/412.1 |
| 2011/0238544 | A1 | 9/2011 | Segall | |
| 2014/0379814 | A1* | 12/2014 | Graff | H04M 1/7243 709/206 |
| 2016/0188571 | A1* | 6/2016 | Daniel | G06Q 50/01 704/9 |

(Continued)

FOREIGN PATENT DOCUMENTS

WO    WO 2019/108682 A    6/2019

OTHER PUBLICATIONS

International Search Report and Written Opinion for PCT Application No. PCT/US2020/065287, dated Feb. 17, 2021, 10 pages.

*Primary Examiner* — Ryan J Jakovac
(74) *Attorney, Agent, or Firm* — Polsinelli LLP

(57) ABSTRACT

The present disclosure relates generally to systems and methods for facilitating proactive two-way communication sessions. One example includes proactively sending a message, where when the message is received, the message initiates a conversation with a user across a first messaging platform. When it is dynamically determined that the first messaging platform is unavailable, a list of prioritized alternative messaging platforms is dynamically generated. A prioritized second messaging platform is selected from the list of prioritized alternative messaging platforms, and the message is dynamically modified in accordance with standards associated with the prioritized second messaging platform. When a response is then received after sending the modified message on the prioritized second messaging platform, an agent is selected from a pool of agents to respond.

33 Claims, 19 Drawing Sheets

(56) References Cited

U.S. PATENT DOCUMENTS

| | | | |
|---|---|---|---|
| 2016/0189210 A1* | 6/2016 | Lacey | G06N 7/005 |
| | | | 705/7.31 |
| 2017/0063763 A1* | 3/2017 | Hu | H04L 51/063 |
| 2017/0295258 A1* | 10/2017 | Raleigh | H04L 67/02 |
| 2017/0303325 A1* | 10/2017 | Hayes, Jr. | G06Q 30/0256 |
| 2018/0189793 A1 | 7/2018 | Campos et al. | |
| 2020/0349614 A1* | 11/2020 | Batcha | H04L 51/14 |

* cited by examiner

Campaign Name — 304
Campaign 2020-11-30 16:26:13

Channel — 306
Prioritized ▾
WhatsApp  +12025167756 ▾ — 704
SMS  +12025167756 ▾ — 706
SMS
24_hours_delayed_response (de) ▾ — 708

Route to Skill — 308
sales ▾

Lookback Period — 310
30 days ▾   0 hours ▾

Prioritized Message Preview  710
Es liegt eine Antwort zu Ihrer Anfrage vor: ◂ ▸

${{1}}

You can only replace variables like ${{1}} with plain text. In this case, the same text will be sent to all recipients. Or you can upload a CSV with a personal message for each phone.

Fallback Message Preview ⬤ 712  Enable   115/140
Es liegt eine Antwort zu Ihrer Anfrage vor: ◂ ▸

Fallback message will have same content. It is strongly recommended to use a message that is less than 140 characters including the variables text.

( Cancel )   ( Save draft )   ( Next )
   314           316            318

FIG. 7

PROACTIVE CAMPAIGNS | ANALYTICS | MESSAGE TEMPLATES | SETTINGS ← 1400

⌕ Proactive Campaigns

⊙ 1402 Response Rate 20.83% 95/456

⊙ 1404 Success Rate 84.76% 456/538

⊙ 1406 Opts-Outs 0% 0/538

Recent Campaigns ● New Campaigns ⋮ — 1420

| 1408 NAME ▼ | 1410 CHANNEL ▼ | 1412 RECIPIENTS | 1414 CREATED BY | 1416 SKILL | 1418 LAUNCHED | 1419 STATUS ▼ |
|---|---|---|---|---|---|---|
| Demo | PRIORITIZED | | | | | |
| Demo | PRIORITIZED | | | | | |
| Campaign 2020-11-25 13:11:10 | ⊙ WA | 1 | Linh Tran | sales | Nov 30 1:20 PM | ↻ Finished |
| Campaign 2020-11-25 12:57:51 | ⊙ WA | 1 | Linh Tran | sales | Nov 30 1:16 PM | ⊘ Failed |
| Workato SF new lead | ⊙ WA | 1 | prmsg_not_onboarded | sales | Nov 25 4:11 PM | ↻ Finished |
| Campaign 2020-11-11 09:07:09 | ▣ SMS | 1 | prmsg_not_onboarded | sales | Nov 25 3:58 PM | ↻ Finished |
| Campaign 2020-11-11 08:28:28 | ▣ SMS | 1 | API | WhatsApp | Nov 18 1:20 PM | ⊘ Failed |
| testproduswareporting | ⊙ WA | 2 | proactive-campaign-manager | sales | Nov 11 12:12 PM | ↻ Finished |
| Campaign 2020-11-09 18:23:46 | ⊙ WA | 1 | proactive-campaign-manager | sales | Nov 11 11:28 AM | ↻ Finished |
| Campaign 2020-11-09 18:21:20 | ▣ SMS | 1 | API | sales | Nov 9 9:31 PM | ↻ Finished |
| testproduswaOutbondNumber | ⊙ WA | 2 | US PRMSG | sales | Nov 9 9:24 PM | ↻ Finished |
| | | | US PRMSG | sales | Nov 9 9:21 PM | ↻ Finished |
| | | | API | sales | Nov 9 9:17 PM | ⊘ Failed |

FIG. 14

SYSTEMS AND METHODS FOR A PROACTIVE TWO-WAY CONVERSATION

CROSS-REFERENCE TO RELATED APPLICATIONS

The present application claims the priority benefit of U.S. Provisional Patent Application No. 62/948,673 filed on Dec. 16, 2019, the disclosures of which is hereby incorporated by reference in its entirety for all purposes.

FIELD

The present disclosure relates generally to systems and methods for facilitating messaging between customers and brands. More specifically, techniques are provided to deploy a framework to assist brands in obtaining responses from customers on a proactive basis.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures:

FIG. 7 shows a user interface for proactively sending a message in accordance with at least one embodiment;

FIG. 14 shows a user interface for proactively sending a message in accordance with at least one embodiment;

Figure 1:
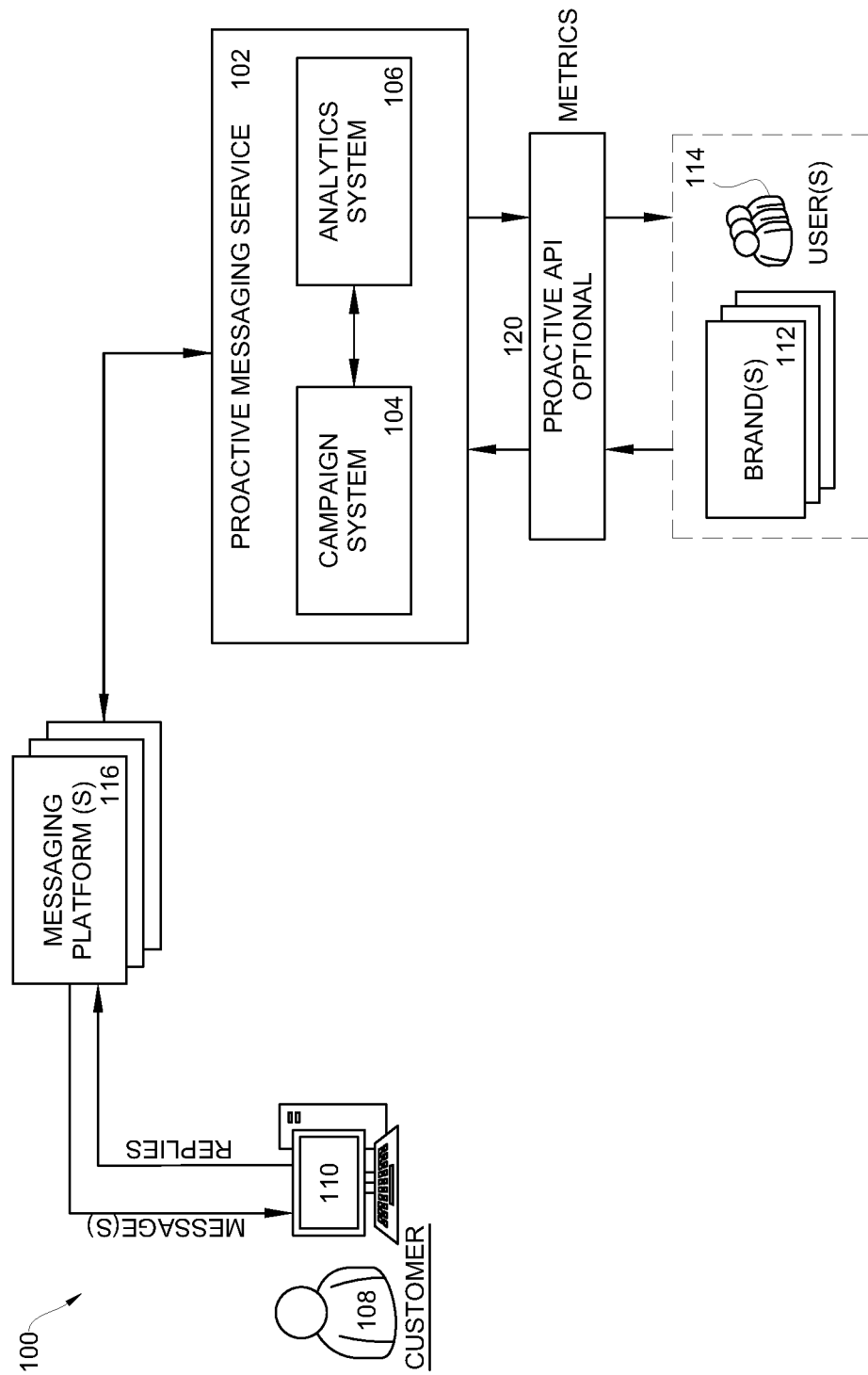
FIG. 1 shows an illustrative example of an environment in which a proactive messaging service obtains campaign information from a brand(s) and presents a customer with a message over one or more messaging platforms in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Embodiments of the present invention provide for users of a proactive messaging service to proactively send outbound messages to one or more customers to initiate a two-way conversation with them on various messaging platforms, such as, but not limited to: SMS, WhatsApp, Facebook Messenger, Google RBM and/or WeChat. Any brand that wants to leverage the proactive messaging service can build deep relationships with their customers by engaging them with personalized conversations in real-time (or near real-time) on any channel. The proactive messaging service provides brands with a holistic solution to manage parts or even all of their customer engagements from within the proactive messaging service.

In some embodiments, brands can use the proactive messaging service to proactively initiate two-way conversations with their customers on any messaging platform such as SMS, WhatsApp, Google RCS or even on the brand's mobile app. This new capability positions the proactive messaging service to be a one-stop solution for brands to build relationships and engage with their customers as it enables brands to both respond to customers who reach out and also proactively share value-added information with their customers. Brands can now leverage the proactive messaging service to generate leads for their conversation commerce scenarios by sharing timely information, such as reminders about bill payments, abandoned carts, new deals, and/or provide updates on when a product that a customer expressed interest in is back in stock.

Brands have a variety of tool options to proactively reach their customers. They can use these tools to send push notifications to reach their app users, send browser notifications to reach their website visitors, and/or send SMS messages to reach their mobile users. While these tools help brands send an outbound message to a customer, they do not give brands the ability to receive a customer's response to that outbound message, which makes it difficult for brands to track the effectiveness of a proactive campaign. Brands can only infer how effective a campaign is based on indirect metrics such as click-thru-rates or open rates of the messages they send. When a brand uses the proactive messaging service to send a proactive message to a customer on any messaging channel, such as iMessage, the customer has the option to respond back to the message on the same messaging thread and carry on a two-way conversation with brand. This helps the agent understand the context of the customer inquiry which increases the efficiency with which they can resolve the customer's ask.

When a brand's agent receives a response from a customer for a proactive message, they also receive the context of what the customer is responding to. This information enables brands to direct customers to the most appropriate agent pool or automations that can help the customer in the most efficient manner possible. Additionally, brands can measure the customer's satisfaction with the proactive conversations which provides them a direct signal on the brand's proactive strategy.

For example, a one way can be turned into a two way conversation. So instead of only sending out blast messages to multiple conversational platforms, the one way conversation can be turned into a two way conversation. For example, once a message is sent out, a customer can then respond to it, and then the proactive messaging service platform can initiate a two way conversation within the main language platform. In addition, the proactive messaging platform can proactively reach out without waiting for someone to engage with the system first.

Companies that wish to use the proactive messaging service may login through an account linked to the company. They can have the ability to see all active campaigns and all historical campaigns. Active campaigns can send a message to somebody over either SMS WhatsApp, Apple business chat, Google, IBM, etc. This allows a company to reach out through many channels to reach a broader audience.

A company, for example, can send out a blast message on one or multiple platforms. A user can reply to that number and start an ongoing conversation with an agent of the company. This conversation can be recorded and stored, so that at any time, another agent may read the conversation (to get context) and jump into the conversation in addition to—or to replace—the initial agent. For example, sometimes a conversation can take multiple days. If the user wants to keep the conversation going, but the initial agent is not working, then any agent from a pool of agents can keep the conversation going.

In some embodiments, the intention is that eventually each of these channels of communication can have a different set of business guidelines that dictate how the messages are delivered to the customer. And in some embodiments, that complexity can be abstracted. So if a brand wants to send a message, the system can use a phone number to determine: are they on WhatsApp, are they on Facebook Messenger, or is SMS the best channel. The system can determine what the best channel is and send that message to the user.

In some embodiments, companies log into the proactive messaging service with a single sign on, create a campaign, and provide consent to proactively reach out to customers. Then, in addition to responding to the customers, agents of the brand can have the ability to start a conversation with a specific customer once that customers responds to the proactively sent message. The agent can start a new conversation, for example, by entering the phone number, picking a messaging channel, writing a message, etc. If the customer responds back, the agent continues as if it's yet another conversation.

FIG. 1 shows an illustrative example of an environment 100 in which a proactive messaging service 102 obtains campaign information from brand(s) 112 and presents a customer 108 with a message over one or more messaging platforms 116 in accordance with at least one embodiment.

In the environment 100, user(s) 114, via a messaging application implemented on a computing device, transmits a request to a campaign system 104 of a proactive messaging service 102 to obtain one or more responses to the request from one or more customers 108 associated with one or more messaging platforms 116. The customers 108 may include users of the messaging platform's 116 community that may also interact with brands 112, such as responding or communicating with brands 112 and/or agents of brands 112. For example, the agents may have experience with regard to various topics, goods, services, or other areas associated with the messages. Messaging platforms 116 may interact with customers 108 via an application implemented on a computing device 110, which may allow the ability of customer 108 to interact with brands 112 and other users 114 (such as agents) that are associated with the proactive messaging service 102 (e.g., community of users that utilize the proactive messaging service 102) and may provide goods and services to customers). The proactive messaging service 102 may provide a platform for customers 108 and brands 112 to connect in order to provide recommendations and advice with regard to replies to messages submitted by these customers 108.

The proactive messaging service 102 may, on its own or at the direction of brands 112, initiate a conversation with potential customers (e.g., customer 108) by proactively sending a message to a group of potential customers across two or more messaging platforms 116. In some embodiments, in response to obtaining a request from brands 112 to initiate a campaign, the campaign system 104 may request and/or evaluate characteristics of the request to extract information needed to generate the campaign. In an embodiment, brands 112 define through a user interface the parameters and characteristics of the campaign (such as who to contact, when to initiate conversation, etc.), which is then used by campaign system 104 to implement the campaign in processes in accordance with the parameters and characteristics across messaging platform 116.

Additionally and/or alternatively, in some embodiments campaign system 104 utilizes a machine learning model to process the request in order to identify and extract the intent from the request. The machine learning model may be used to perform a semantic analysis of the request (e.g., by identifying keywords, sentence structures, repeated words, punctuation characters and/or non-article words) to identify the characteristics and/or parameters expressed in the request to proactively initiate conversations with customer 108. In some embodiments, the machine learning model utilized by campaign system 104 may be dynamically trained using supervised learning techniques. For instance, a dataset of input requests and known intents included in the input requests can be selected for training of the machine learning model. In some implementations, known proactive campaign characteristics and/or parameters may be used to train the machine learning model. The machine learning model may be evaluated to determine, based on input sample responses to proactively sent messages supplied to the machine learning model, whether the machine learning model is extracting the expected response from each message sent. Based on this evaluation, the machine learning model may be modified to increase the likelihood of the machine learning model generating desired results, such as a response to proactively sent messages. For example, the machine learning model may determine that a messaging platform may be unavailable, and campaign system 104 may dynamically prioritize or reprioritize messaging platforms and/or brand agents in real time or near real time based on which messaging platforms are available. The machine learning model may in some embodiments use information submitted by brands 112, such as information related to the campaign's characteristics and/or parameters, to make dynamic decisions related to reprioritizing which messaging platform to use, the time period(s) in which to send proactive messaging, which customers 108 to reach out to based on message content, etc.

The machine learning model may further be dynamically trained by soliciting feedback from customers, including customer 108, with regard to the messages submitted by campaign system 104. For instance, natural language processing may be employed to extract the content of a reply from customer 108. The response from the customer 108 may, thus, be utilized to train the machine learning model based on the accuracy of the machine learning model in identifying when and/or how to proactively send a message to customer 108.

In some embodiments, the campaign system 104 may provide extracted historical information about customer 108 response, such as information that pertains to a likelihood of receiving a reply from proactively sent messages, to the machine learning model of the proactive messaging service 102. In an embodiment, the machine learning model can utilize information regarding different brands 112 and other users associated with the proactive messaging service 102, as input to the machine learning model to identify one or more brands 112 and/or other customer 108 that may be likely to provide responses to proactive messaging. The information regarding the different brands 112 and customers 108 may include historical data corresponding to responses submitted by the different brands 112 and customers 108 to previously provided messages or messages with similar characteristics and/or parameters (e.g., messages proactively sent during a period of time, having certain content and/or messaging tone, etc.). The historical data may indicate a brand's 112 or customer's 108 behavior in providing responses to different proactively sent messages submitted to the customer 108, information regarding any prior interactions across certain messaging platforms 116 between the brand 112 and the customer 108 (e.g., customer 108 may prefer one messaging platform over another, such as SMS over WhatsApp)), customer 108 feedback (if any) related to a customer's 108 interaction with the brand 112, and the like. Further, the information regarding a brand or customer 108 may specify what goods and services are provided by a brand 112, what goods or services customer 108 has utilized, or any other information that may be useful in identifying whether a reply to a proactive message may be dependent on these goods and services.

The output of the machine learning may include identifiers corresponding to the brands 112 and/or customers 108 to which certain campaign characteristics and/or parameters is to be provided in order to solicit responses from each of the customers 108. The certain campaign characteristics and/or parameters may be assigned a unique identifier such that responses obtained from the customers 108 may be associated with the particular certain campaign characteristics and/or parameters by reference to the unique identifier. In an embodiment, the campaign system 104 updates the user interface of the proactive messaging application utilized by each brand 112 to indicate solicitation of a response to a particular message. In an embodiment, a brand 112 (e.g., an agent associated with the brand that is assigned to interact with the intent messaging service 102) or other user 114 receiving an intent is restricted to a single response to the intent. For instance, when an agent associated with a brand 112 or other user 114 submits a response to an intent to the intent processing system 104, the intent messaging application utilized by the agent associated with the brand 112 or other user 114 may disable the ability to submit additional responses to the intent until the customer 108 has indicated that it wishes to engage further with the brand 112 or other user 114 with regard to the intent. This may prevent a brand 112 or other user 114 from inundating (e.g., "spamming") the customer 108 with responses to the intent. Further, should a customer 108 refuse to engage with the brand 112 or other user 114, the customer 108 may be spared from additional responses from the brand 112 or other user 114.

In an embodiment, if the customer 108 determines that they want to communicate with a brand 112 or agent (e.g., users 114) associated with the brand 112 further with regard to the message proactively submitted by proactive messaging service 102, the proactive messaging service 102 establishes a communications channel between the customer 108 and the brand 112 or users 114 through which the customer 108 and brand 112 or users 114 may exchange messages and other content. If the customer 108 indicates that they wish to converse with the brand 112 or other user 114 with regard to the message, the proactive messaging service 102 may transmit an instruction or other indication to the proactive messaging application to enable the brand 112 or other user 114 to submit additional responses to the customer 108 via the proactive messaging application. Further, the proactive messaging service 102 may provide the brand 112 or other user with additional information regarding the customer 108 (e.g., customer name, customer address, customer images, customer contact information, etc.).

In an embodiment, analytics system 106 can, based on an analysis of the messages replied to by customer 108, determine one or more metrics, such as (but not limited to): response rate, success rate, opt-ins/opt-outs, delivery status (e.g., successfully delivered, failed deliveries, scheduled deliveries), response status (e.g., customer 108 responded, did not respond, etc.), or similar.

In some embodiments, a proactive application programming interface (API) 120 can integrate with third party software to initiate the conversation between the customer 108 and the brands 12/agents of the brands (e.g., users 114) within each particular messaging platform. The proactive API 120 can output to the third party software one or more reporting metrics based on the conversation, such as the metrics determined by analytics system 106 outlined above including response rate, total outbound messages, total response, total opt-outs, etc.

Figure 2:
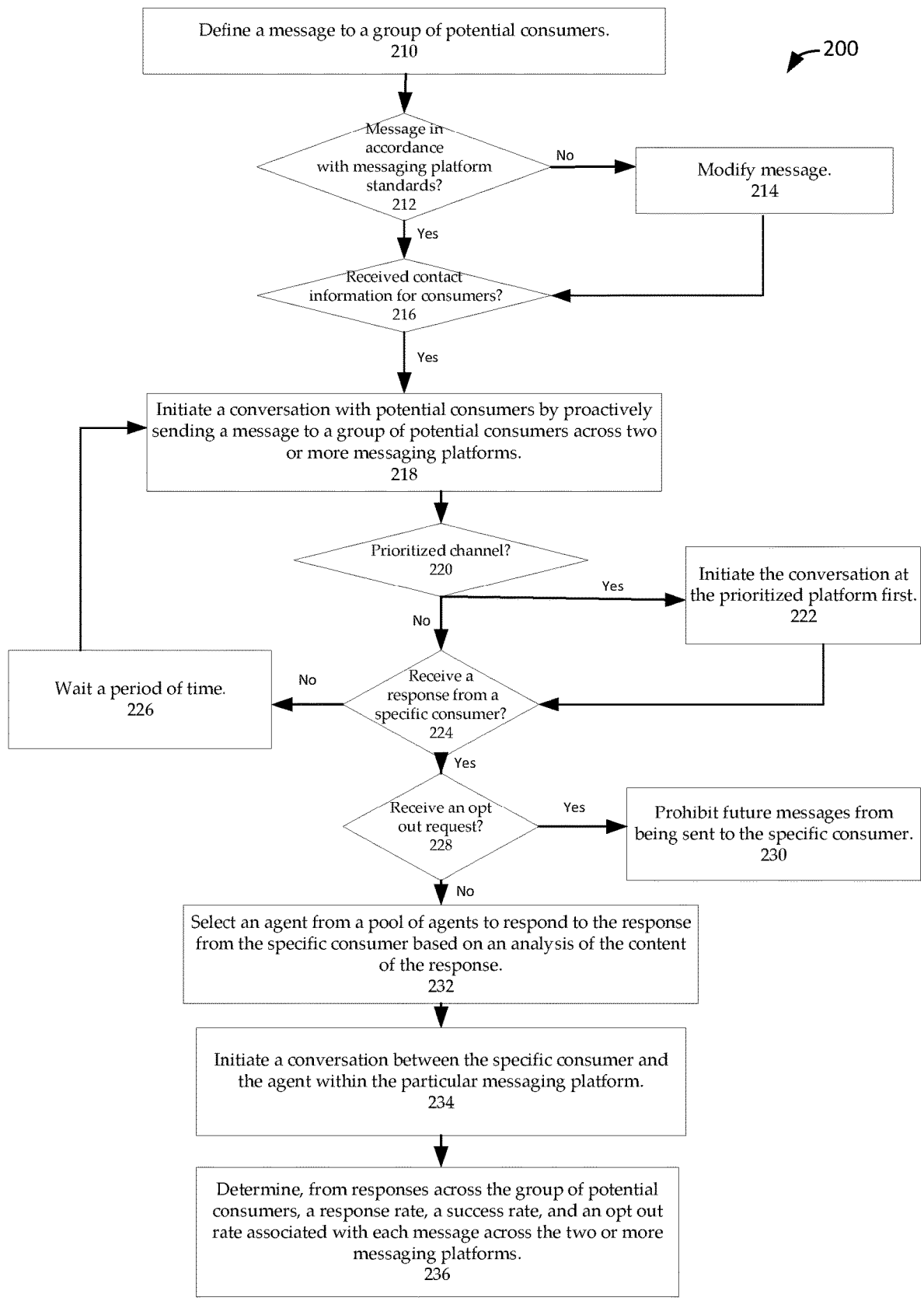
FIG. 2 shows an illustrative example of a process for proactively messaging customers across one or more messaging platforms and determining messaging metrics in accordance with at least one embodiment.

FIG. 2 shows an illustrative example of a process for proactively messaging customers across one or more messaging platforms and determining one or more messaging metrics in accordance with at least one embodiment. The proactive messaging service can craft and send one or more outbound messages to one or more customers on any messaging platform, such as (but not limited to): SMS, Facebook Messenger, WhatsApp, and/or within the brand's own application installed on the customer's device. In some embodiments, the proactive messaging service enables two-way conversations between customers and brands/agents of the brands, unlike other services where the communication is unidirectional (i.e. while other services allow a brand to send a message to their customers, they do not provide a mechanism to capture and direct customer responses. When the proactive messaging service is used to send a proactive message, the customers can respond directly to the message that was sent. Therefore, a brand can receive and respond to all customer messages, including replies to any proactively sent messages, using the proactive messaging service.

Process 200 shows how the proactive messaging service can proactively send a message to a customer, receive a reply to that message from the customer, and then initiate a two way conversation between the customer and brand/agent of the brand. In the proactive messaging service, a message can be defined to a group of potential customer (step 210). For example, in some embodiments, when a brand creates a new proactive campaign within the proactive messaging service, the campaign can define how to dynamically draft a message and choose to send it to a single customer or a group of customers. In some embodiments, agents within the brand can send a message to a specific customer from within the proactive messaging service.

The characteristics and/or parameters of the campaign can be defined by certain attributes that can be applied to who, where, and/or how messages are proactively sent to a customer or group of customers. For example, in some embodiments the attributes of a campaign can be, but is not limited to: name of the campaign, message (e.g., content, attributes of the message, etc.), customer lists, time range to proactively send one or more messages, messaging channel, etc.

Figure 3:
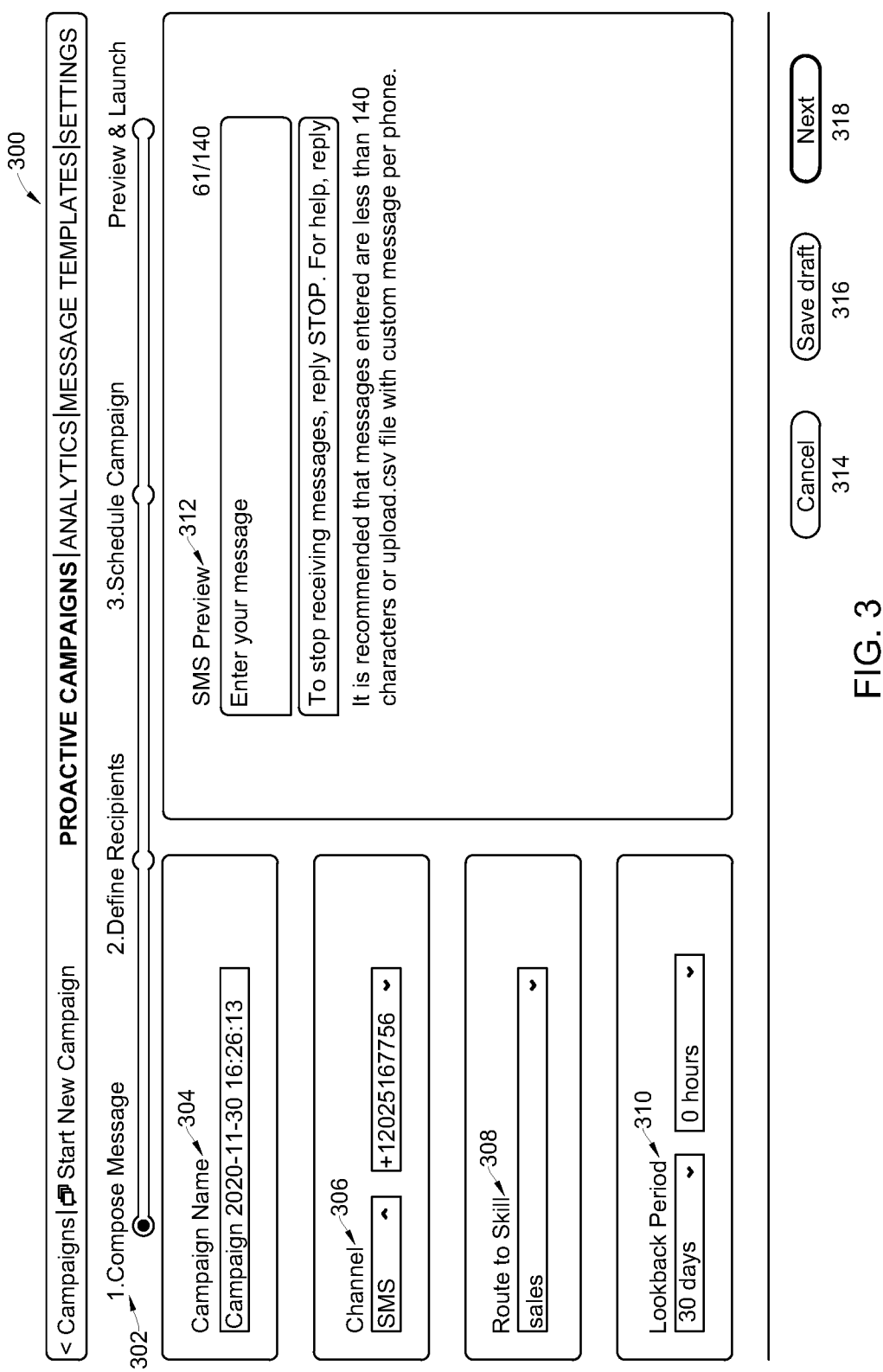
FIG. 3 shows a user interface for proactively sending a message in accordance with at least one embodiment.

FIGS. 3-17 show, for example, some example embodiments of a user interface implementing one or more features of process 200. In FIG. 3, user interface 300 shows display features that allow a brand and/or agents of the brand to define a campaign. For example, user interface 300 can include a status bar 302 that inform the brand whether they are composing characteristics of the proactive message, defining recipients, scheduling the proactive campaign, and previewing/launching the proactive campaign. The campaign name 304 can be defined, what channel 306 the message should be proactively sent over, the skill 304 category any replies to the message should be routed to (e.g., the types of agents who should be on call to communicate with the customer, such as sales, IT, etc.), and the lookback period 310 that defines a time period for when to wait for a response from the customer. The message that will be proactively sent in the campaign is shown within preview window 312, which the brand and/or agent of the brand can modify on a real time or near real time basis. The user interface 300 can also include elements on the interface to cancel 314 the campaign, save a draft 316 of the campaign, and move on to further define attributes of the campaign (e.g., next 318).

Figure 4:
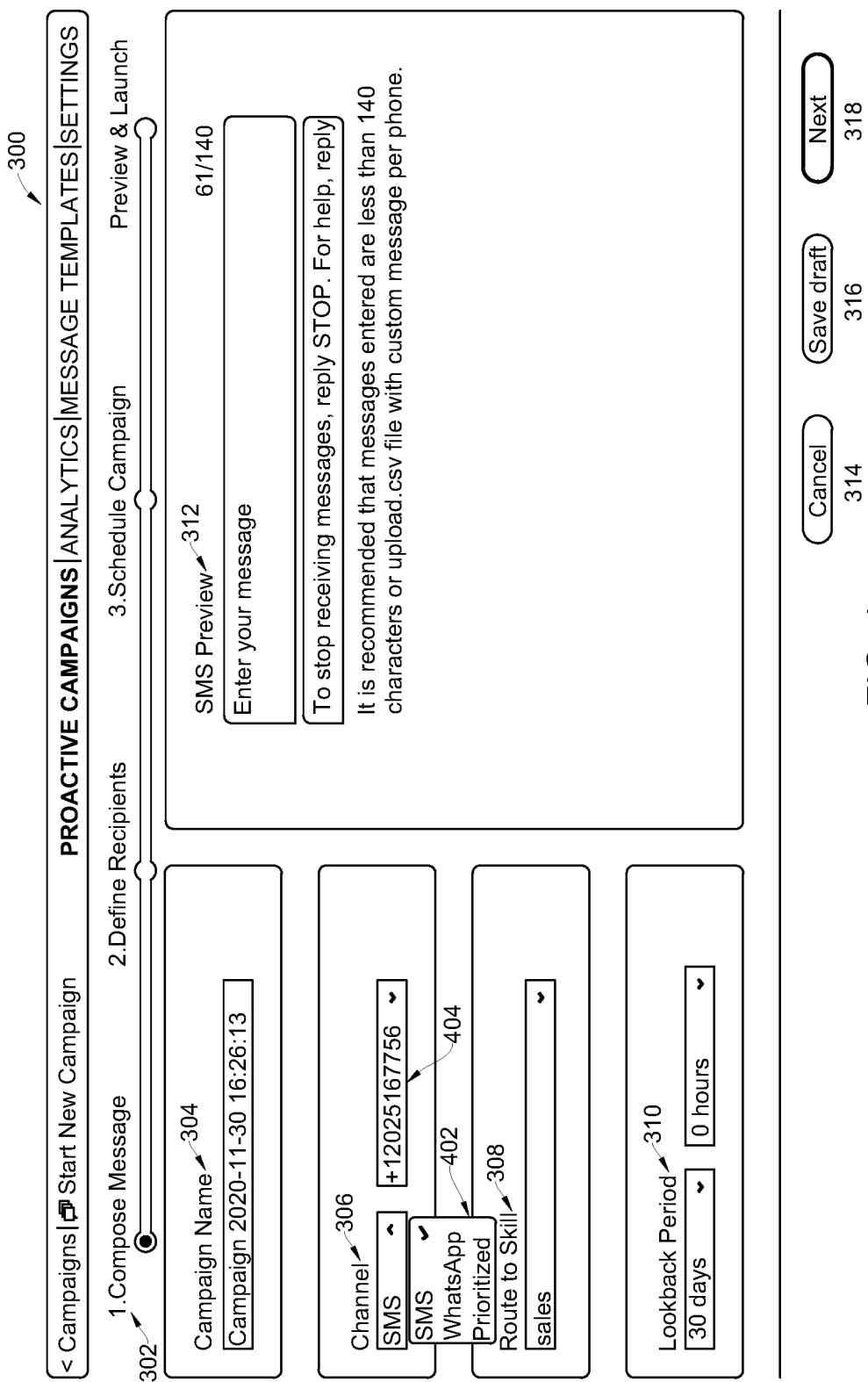
FIG. 4 shows a user interface for proactively sending a message in accordance with at least one embodiment.

FIG. 4, for example, shows that channel 306 can be defined through a channel selector 402, such as a drop down menu or other similar user interface element. Channel selector 402 can present of list of available channels to send a message over to the customer, such as through SMS texting, WhatsApp, etc. The channels may be prioritized (please see FIG. 7 for more discussion). Contact information 404 based on the channel may also be displayed and/or inputted by the brands. In some embodiments, for each channel the proactive messaging service can determine if the message is in accordance with the messaging platform standards (step 212). If so, the message remains in its current format. If not, the message is modified (step 214) to conform to the channel format.

In some embodiments, even if multiple channels are selected (e.g., multiple messaging platforms will be used to send out proactive messages in the campaign) a proactive message will only be sent to one messaging platform per proactive campaign. If there is priority messaging, proactive messages will be sent based on the priority messaging channel order specified for the list of customers. If nothing is specified, a default order will be followed.

Figure 5:
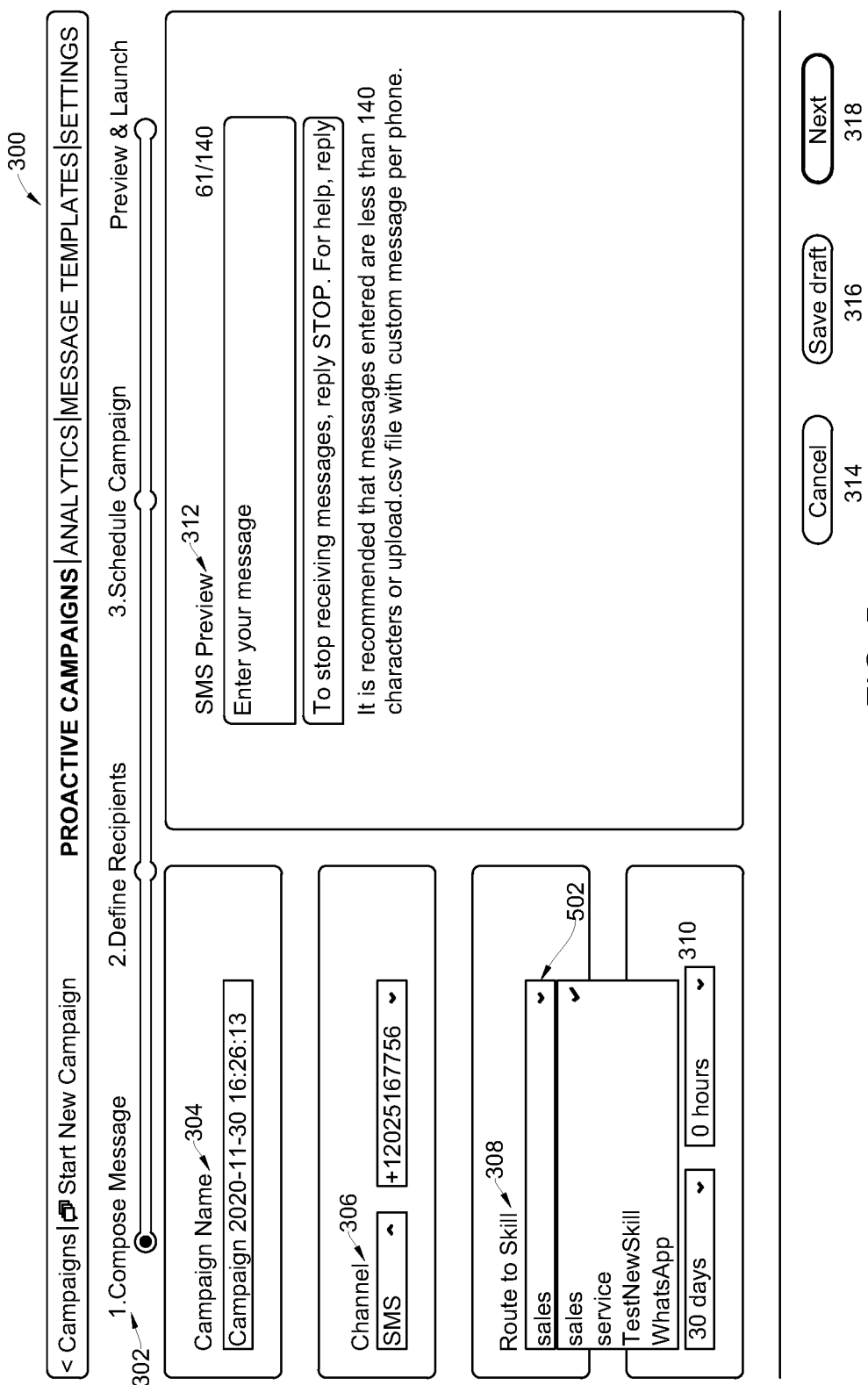
FIG. 5 shows a user interface for proactively sending a message in accordance with at least one embodiment.
Figure 6:
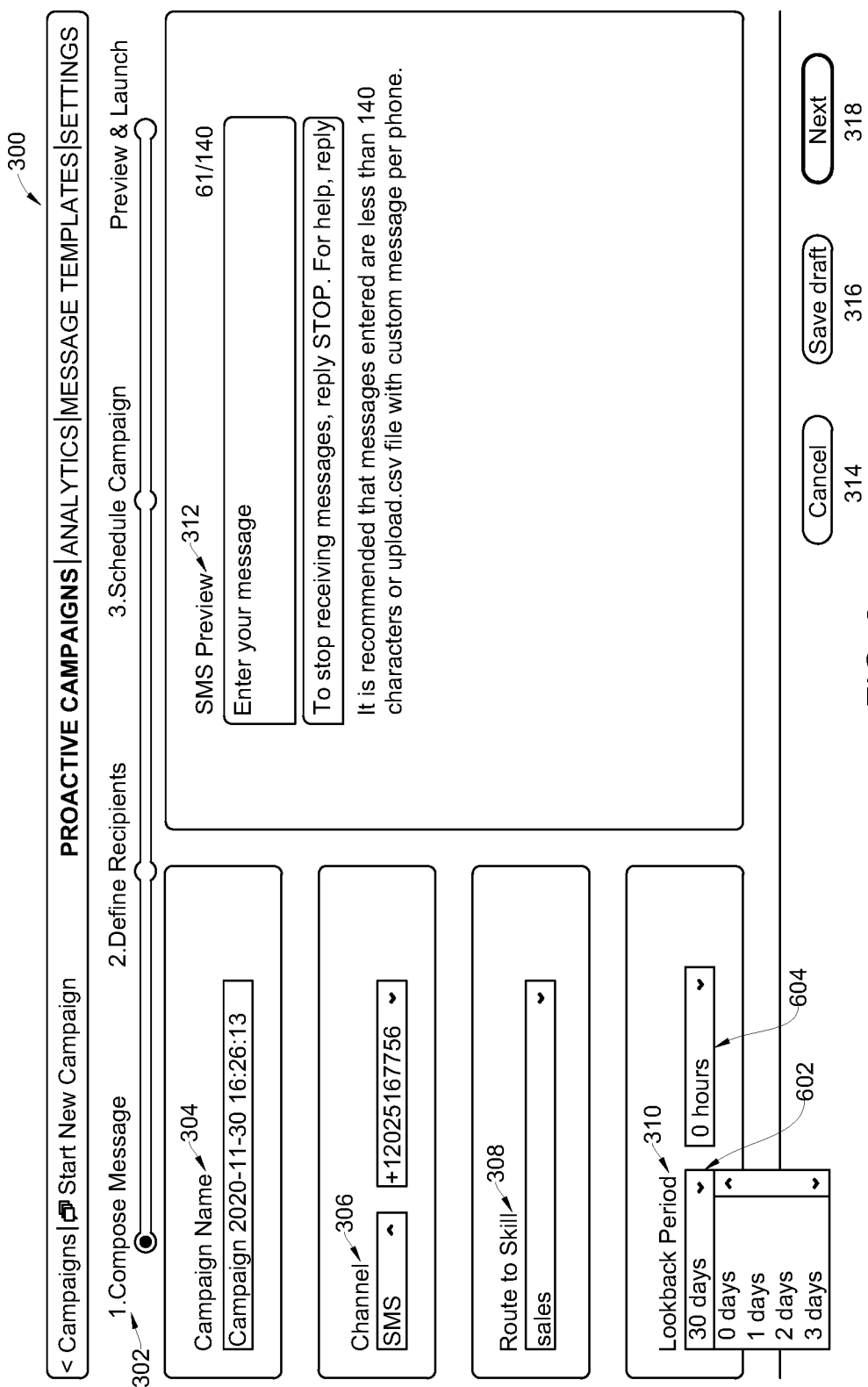
FIG. 6 shows a user interface for proactively sending a message in accordance with at least one embodiment.

FIG. 5 shows an example route to skill 308 that can be defined through a skill selector 502. The skill selector 502 shows skill categories that route a conversation to certain agents within each skill category, such as skills that relate to a certain expertise (e.g., sales, service, etc.), training within a certain channel (e.g., skilled in WhatsApp, SMS, Facebook, etc.), and any other type of skill category. FIG. 6 shows an example lookback period 310, which defines how long the proactive messaging platform should wait after sending a proactive message before sending another message and/or marking a message as nonresponsive. The lookback period 310 can be any length of time, such as (but not limited to) a number of days 602 and a number of hours 604.

Based on receiving contact information for customers (step 216), a conversation can be initiated with potential customers by proactively sending the message to the customer and/or a group of potential customers across the messaging platform(s) (step 218). In some embodiments, brands can choose to send the message to multiple customers by uploading a list, such as through a .csv file format, for uploading customer lists.

In some embodiments, the brands can prioritize certain channels over others (step 220). If a channel is prioritized, the conversation is initiated at the prioritized platform first (step 222).

For example, when creating a proactive campaign, the brand can select from multiple messaging channels how to reach their customers as long as the brand has a presence on that channel. For example, brands can choose between one or more of: Twilio-SMS, CLX-SMS, WhatsApp, Facebook Messenger, Google RBM, WeChat, the brand's iOS and/or Android apps (if the customer has them installed), or similar. The brands can specify the rank order for each of the channels, which is used to determine how to reach the customer. For example, if the brand selects, in order: 1) the brand app, 2) WhatsApp, and then 3) SMS as target channels in that order, the proactive messaging service will first check if the customer has the brand app installed. If yes, the proactive messaging service will send the proactive message to the customer over the brand app. If not, the proactive messaging service will check if the customer has WhatsApp enabled and choose to send the message there. Finally, if the proactive messaging service determines that the customer doesn't have either the brand app or WhatsApp installed, the proactive messaging service will send a message to them via SMS. The proactive messaging service will ensure that the customer receives a specific message on a single channel and that they are not spammed on multiple channels.

For example, FIG. 7 shows an example user interface that illustrates the option to prioritize 702 one or more messaging platforms/channels. In the example embodiment shown, the first prioritized channel 704 is selected as the messaging platform WhatsApp. A preview 710 of the proactive message is shown, which has a form consistent with WhatsApp standards. This form can be modified dynamically or flag areas where the message needs to be corrected to be consistent with WhatsApp standards. The second prioritized channel 706 is selected as SMS text, which also have a preview 712 for the message to be sent over the second prioritized channel in case the first prioritized channel should become unavailable. Each of the first prioritized channel 704 and/or the second prioritized channel 706 can include contact information for one or more customers. In some embodiments, a delay period 708 can be defined that tells the proactive messaging service when to send the proactive message over the second prioritized channel 706 rather than the first prioritized channel 704 (in this example, the proactive messaging service waits 24 hours before sending the proactive message over SMS text instead of WhatsApp).

In some embodiments, the proactive messaging service may set prioritized channel 702 dynamically based on various factors, such as conformity with business rules for each messaging channel. Other factors can include the cost, benefits and/or limitations for one channel versus the other. From there, based on a goal of the proactive campaign, geographical region of your customer, and/or other demographic or historical factors, the proactive messaging service can evaluate which messaging platform will work best. In some embodiments, customers let the brand and/or proactive messaging service know their preferred messaging channel through feedback.

Additionally and/or alternatively, in some embodiments the proactive messaging service can proactively send a message based on one or more machine learning models. For example, when the message is received by the customer, the message can initiate a conversation between a customer and an agent across a first messaging platform. The proactive messaging service can dynamically determine that the first messaging platform is unavailable (through either a failure to send, a change in customer contact information or membership within the first massaging platform, etc.), and in response dynamically generate a list of prioritized alternative messaging platforms. A prioritized second messaging platform can be selected from a list of prioritized alternative messaging platforms, which in some embodiments can dynamically modify the message in accordance with standards associated with the prioritized second messaging platform. After receiving a response from the customer after sending the modified message on the prioritized second messaging platform, an agent can be selected from a pool of agents to respond to the response based on the availability of the prioritized second messaging platform. Any of these steps can be performed on a real time or near real time basis. For example, determining that the first messaging platform is unavailable and generating a list of prioritized alternative messaging platforms can be done on a real time basis so that the proactive messaging platform can remain within the campaign characteristics and/or parameters.

In some embodiments, the proactive messaging service can define a lookback period, where the message is designated as non-responsive when no response from the user is received within the lookback period.

Figure 8A:
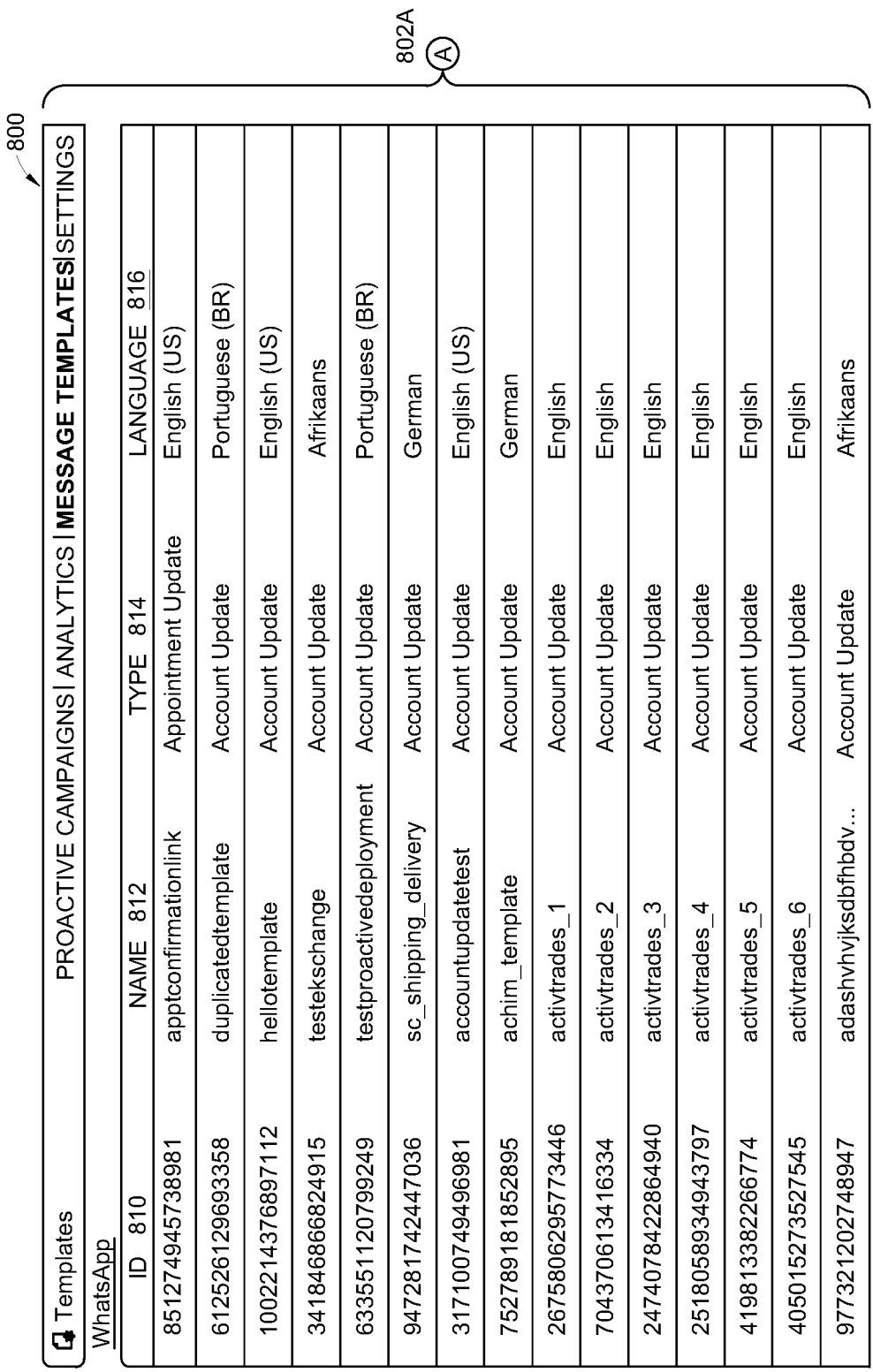
FIG. 8A shows a user interface for proactively sending a message in accordance with at least one embodiment.
Figure 8B:
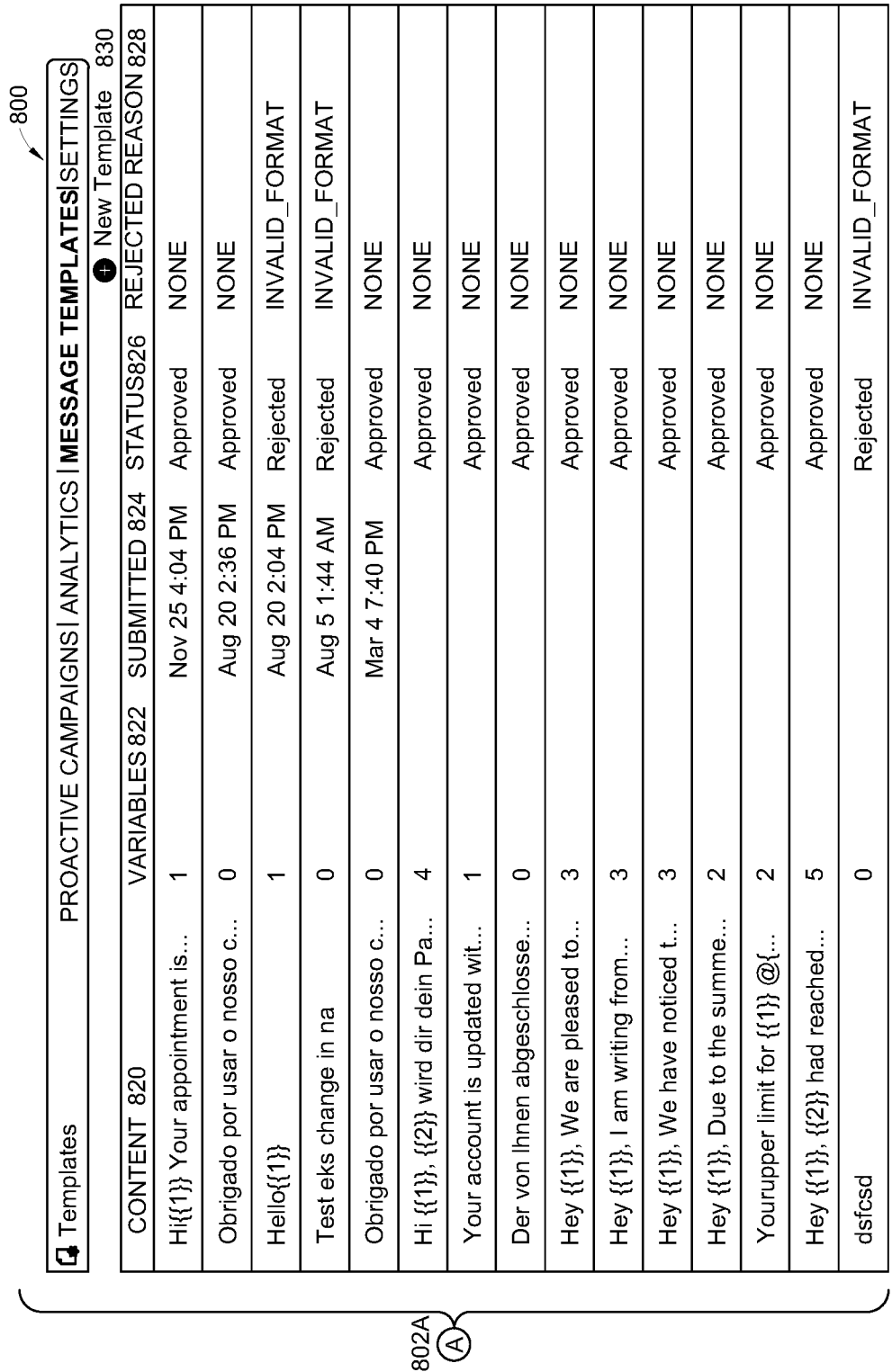
FIG. 8B shows a user interface for proactively sending a message in accordance with at least one embodiment.

FIGS. 8A-8B illustrate that in some embodiments, the proactive messaging service can offer templates 800 that can assist brands in personalizing the proactive experience for their customers. For example, each template 802a can be supported by the proactive messaging service, which is designed to be in accordance with messaging platform standards. The templates 802a can have one or more variables which are allowed to be customized by each brand. Shown for illustration are sample templates that include: an identifier 810, name 812, type of template 814 (e.g., categorizations of template content), language 816, content 820, variables to be personalized 822, time of submission to the proactive messaging service 824, status 826 (e.g., approved or rejected based on being in conformity to messaging platform standards), and/or rejected reason 828. An option to create a new template 830 can be offered as well. These templates 802a can be created and/or modified on a real time or real near time basis, so that as soon as a template 802a is modified, any outgoing proactively sent messages are modified in accordance, even if the modification changes the proactive message in the middle of a predefined campaign period. In some embodiments, the variables can be modified dynamically using the aforementioned machine learning model that can predict which variables need to be modified (and to what value) in order to maximize a reply from a particular customer or group of customers.

Figure 9:
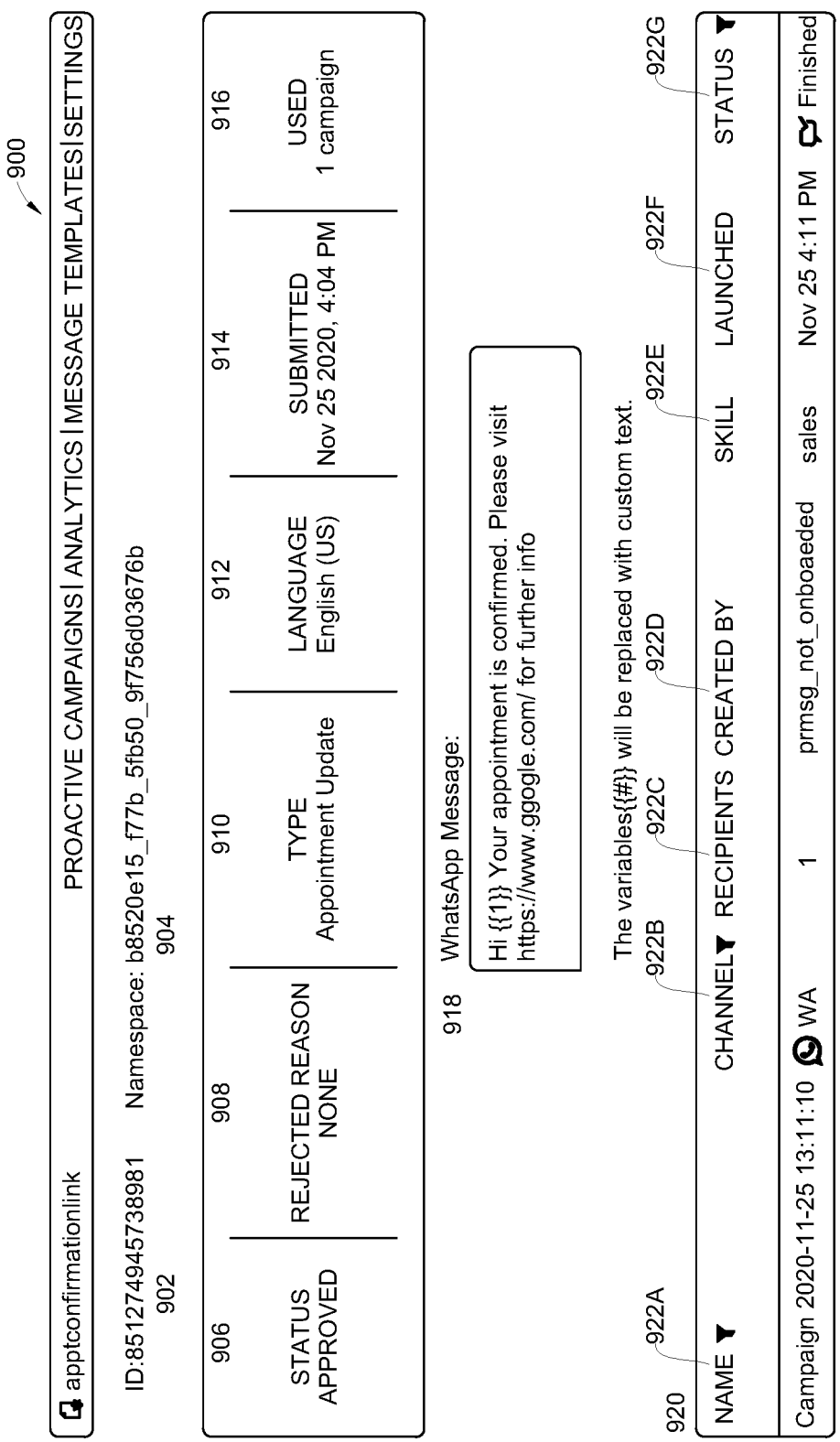
FIG. 9 shows a user interface for proactively sending a message in accordance with at least one embodiment.

FIG. 9 shows an example template of the templates 8002*a* described in FIGS. 8A-8B, which can include an ID 902 and name 904 defined within the template interface 900. This template can be used by any brand and include any personalized content, which can be modified on a real time or near real time basis. In the example embodiment shown, the template can include the status 906, rejected reason 908 (if any), message type 910, language 912, date of submission 914 to the proactive messaging platform, and or how many campaigns 916 the template has been used in. The template can include the message content 918 that includes variables that can be replaced by custom text. For example, if the template pertains to confirming an appointment, the message content 918 can include template language around appointment confirmations with one or more modifiable variables included to personalize the message content 918 to the brand and/or targeted customer. For example, the variables can be related to a time, date, contact information, etc.

In some embodiments, the variables can be modified on a real time or near real time basis. If the messaging platform is changed (for example, due to unavailability), then the proactive massaging service can modify the variables to reflect the standards of an alternative messaging platform. In other embodiments, the contact information for the customer may change, and the proactive messaging service can dynamically modify the contact information for the customer.

Once the template is used, the template interface 900 can include template usage information 920 that can include, but is not limited to, the campaign name 922A, the channel 922B the template was used in, number of recipients 922C, the author 922D of the customized template, the skill 922E the message routes to, the launch date 922F, and/or the status 922G of the message (e.g., finished, not received, etc.).

Figure 10:
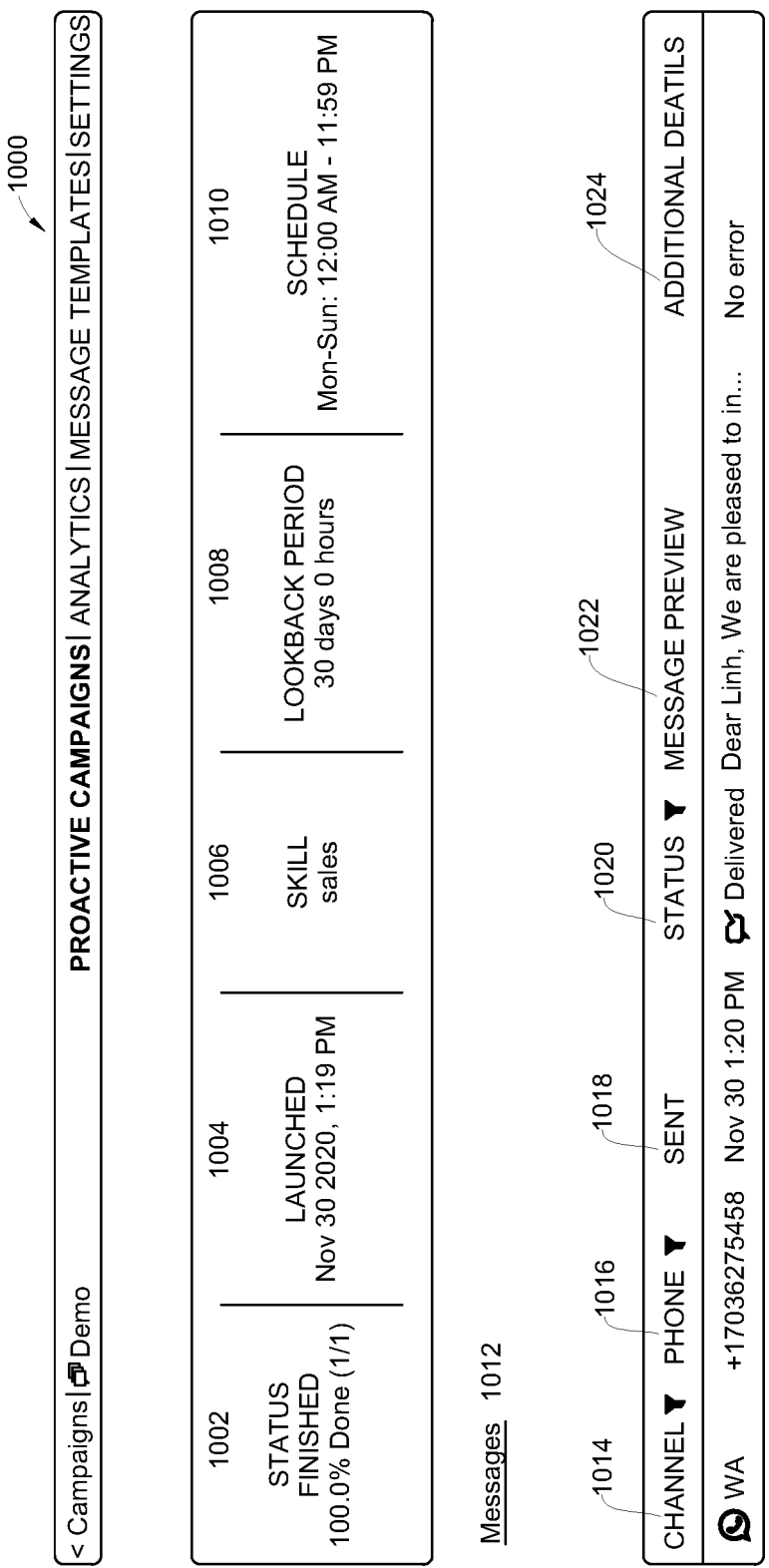
FIG. 10 shows a user interface for proactively sending a message in accordance with at least one embodiment.

FIG. 10 shows another example interface 1000 that shows that for each campaign, information can be displayed about proactively sent messages, including that status 1002 of the message, launch date 1004, skill 1006 of the agent the conversation was routed to, lookback period 1008, and messaging schedule 1010. For each proactively sent message 1012, information such as the channel 1014, contact information 1016, sent date 1018, status 1020 (e.g., delivered, not delivered, etc.), message preview 1022, and/or any additional details 1024 (e.g., such as errors that may have occurred) can be displayed.

Figure 11:
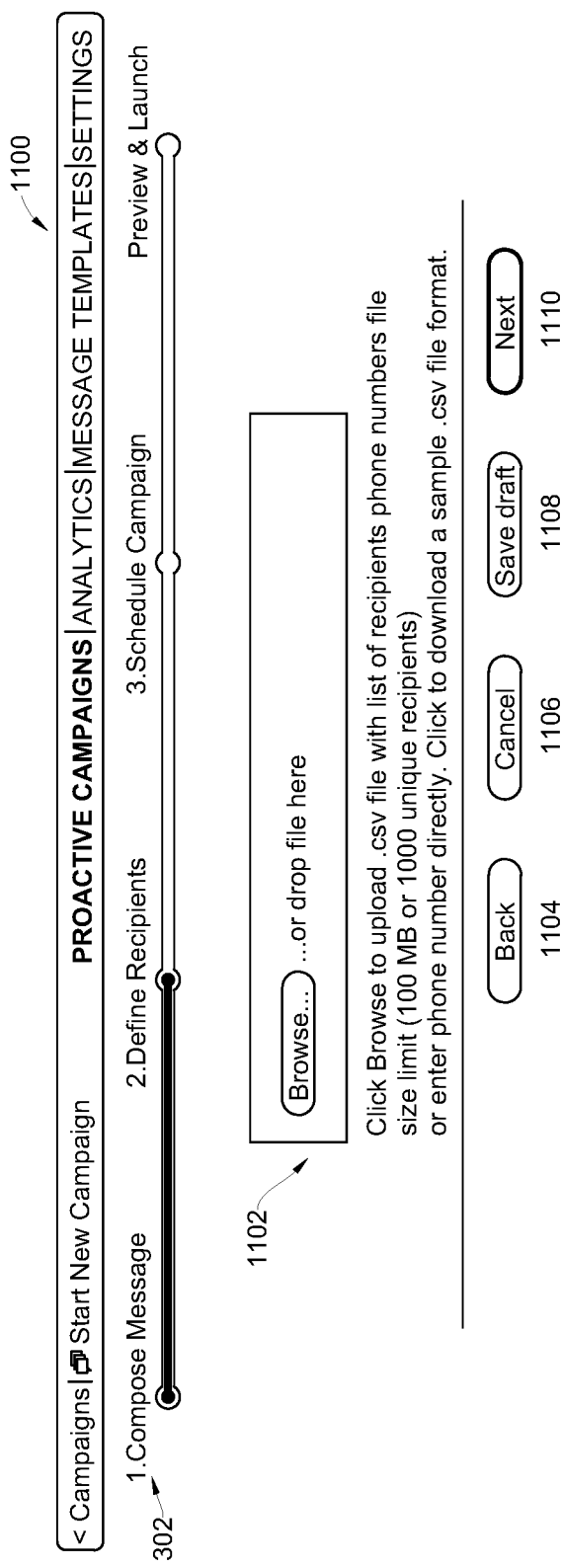
FIG. 11 shows a user interface for proactively sending a message in accordance with at least one embodiment.

FIG. 11 illustrates an example interface 1100 that defines recipients for the campaign. Recipient information 1102 can be received through, for example, a .csv file or similar format. The file can include a list of customer contact information.

Figure 12:
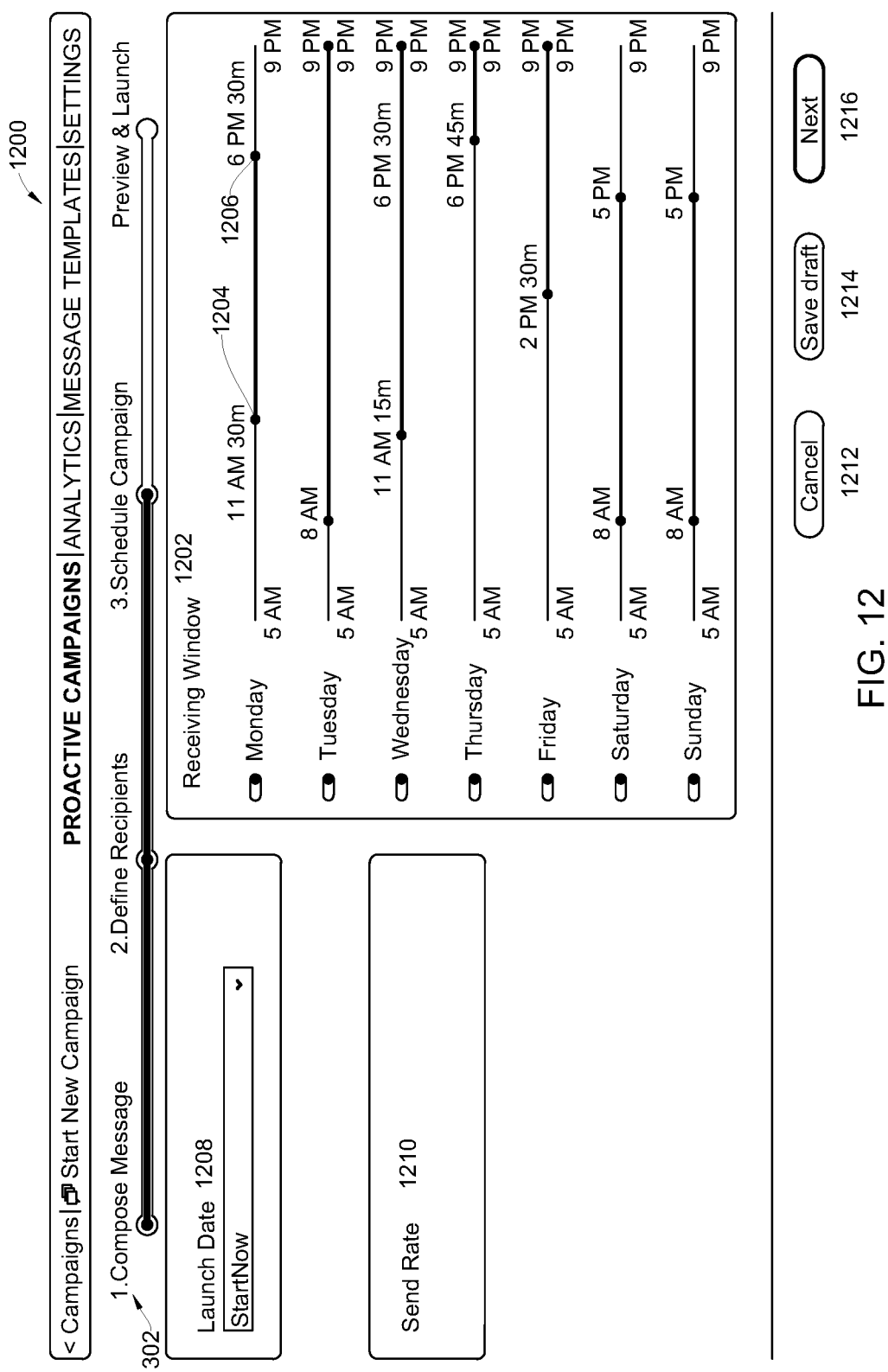
FIG. 12 shows a user interface for proactively sending a message in accordance with at least one embodiment.

FIG. 12 illustrates an example interface 1200 of a receiving window 1202, which defines one or more periods of time in which to send a proactive message to one or more customers. Interface 1200 can, for example, receive input at one or more slidable elements on the user interface to define one or more time periods to send a proactive message. For example, the slidable elements in the example embodiment define the receiving window for Monday between a beginning time period 1204 (11 am) and an ending time period 1206 (6 pm). The receiving window can be personalized for each day or other time period. In some embodiments, the receiving window 1202 can excludes certain time periods from sending a proactive message, even if a brand defines the receiving window 1202 within that time frame. For example, regulations (which may vary locally) may exclude unsolicited messages from being sent late at night or in the early morning, such as between the periods of 8 PM and 5 AM. Even if the brands decide to include 9 PM within the receiving window 1202, the proactive messaging service will prohibit proactive messages from being sent to conform to local regulations.

Interface 1200 may also define a launch date 1208 that defines when to send proactive messages to one or more customers within the receiving window. Interface 1200 may also define a send rate 1210 so that a customer is not sent multiple messages at a greater rate than that defined. Interface 1200 may also have an option to cancel 1212, save draft 1214, and move on (next 1216).

In some embodiments, one or more machine learning models may define the receiving window 1202 on a real time or near real time basis. For example, the proactive messaging service may determine that the message will not be received at a first messaging platform (e.g., WhatsApp) within the one or more time periods defined by receiving window 1202. In response, the proactive messaging service can dynamically modify the one or more time periods in accordance with when the first messaging platform will become available or decide to send the message in accordance with a receiving window 1202 based on the second messaging platform (e.g., SMS text).

Figure 13:
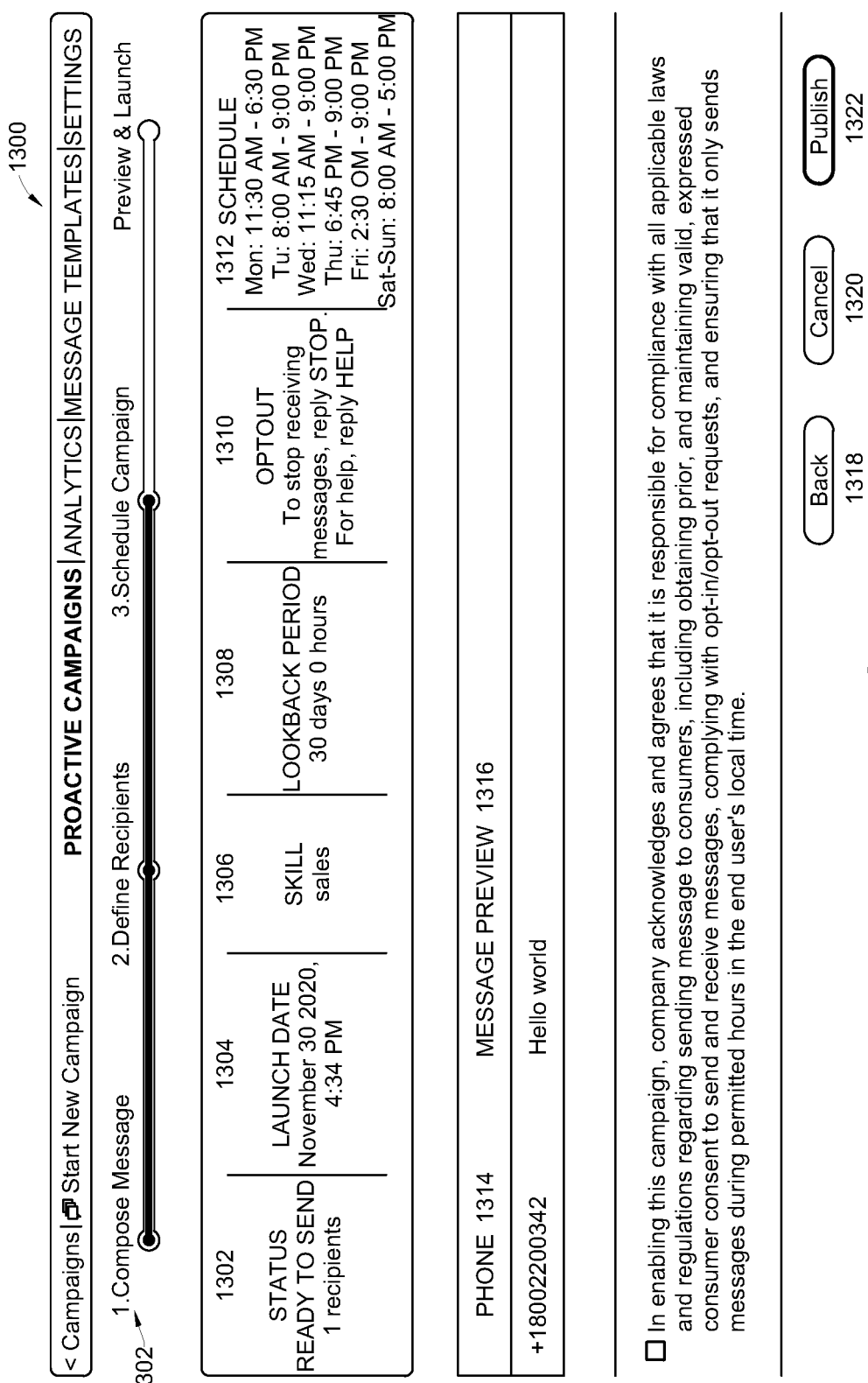
FIG. 13 shows a user interface for proactively sending a message in accordance with at least one embodiment.

FIG. 13 illustrates that once the receiving window has been defined, it can be included in the schedule 1312 along with information such as the status 1302, launch date 1304, skill 1306 of the agent the conversation will be routed to (if a reply is received), lookback period 1308, and/or opt out 1310 conditions. The contact number 1314 and message preview 1316 can be displayed before being proactively sent to the customer. Like other interfaces, interface 1300 can include the option to go back 1318, cancel 1320, and/or publish 1322 the campaign.

Next, method 200 can proactively send the message according to the parameters and/or characteristics defined in FIGS. 3-13. The proactive messaging service can then wait to determine if a response has been received within the lookback period (step 224, step 226).

If a response has not been received, the proactive messaging service may determine that a customer is non-responsive due to an unavailability of a messaging platform/channel. For example, the proactive messaging service can display an option on a user interface for selecting a preferred messaging platform as the first messaging platform (e.g., WhatsApp), and then prioritizing the first messaging platform above other messaging platforms. Based on determining that the first messaging platform (WhatsApp) is unavailable, the proactive messaging service may reprioritize in a real time or near real time basis a list of prioritized alternative messaging platforms. Therefore, in subsequent messages, the proactive messaging platform can dynamically lower the prioritization of the first messaging platform based on a model that predicts unavailability of the first messaging platform. This can be a similar process for agents, where the proactive messaging service can reprioritize the pool of agents to respond on a real time basis when the list of prioritized alternative messaging platforms are reprioritized. This can be done based on one or more machine learned models, or can be done on a manual basis.

If, during the lookback period, the proactive messaging service receives an opt out request (step 228), future messages can be prohibited (step 230) from being sent to the specific customer. For example, the opt out request can be determined on a real time basis through natural language processing. In some embodiments, brand agents can obtain consent at the end of any prior conversation. Brands will have an option to do this manually or use a consent bot. In some embodiments, the proactive messaging service can receive an existing list of opt-out customers, which can then be imported and merged into the data within the proactive messaging service platform.

A customer can opt out by replying to the proactively sent message. Opt-outs will follow FCC regulation in the content of the message. In some embodiments, an acknowledgement message can be sent following a customer's opt-out to reassure the customer that their request has been received, will be acted on, and share information on a way to opt back in (if desired).

An example opt out message can be:

Please reply YES to receive updates from Example Company. Std. msg&data rates apply.

Approx 5 msg/month. Reply HELP for help, STOP to cancel.

STOP

You have been successfully unsubscribed. You will not receive any more messages from this number. Reply START to re-subscribe.

START

You have been successfully re-subscribed to messages from this number. Std. msg&data rates apply. Approx 5 msg/month. Reply HELP for help, STOP to cancel.

A customer can further opt back in by replying to the message using the opt-in language.

EXAMPLE

STOP

You have been successfully unsubscribed. You will not receive any more messages from this number. Reply START to re-subscribe.

START

You have been successfully re-subscribed to messages from this number. Std. msg&data rates apply. Approx 5 msg/month. Reply HELP for help, STOP to cancel.

If the customer has previously opted out of a messaging conversation, the customer will not be receiving any further messages from the brand. Only when the customers specifically opt-in again via existing messaging conversation or existing methods managed by brands, they will receive messaging from proactive campaigns.

If a customer replies and does not opt out, then a conversation can be initiated between the customer and agent of the brand. For example, an agent can be selected from a pool of agents to respond to the response from the specific customer based on an analysis of the content of the response (step 232). This initiates the conversation between the specific customer and the agent within the particular messaging platform (step 234).

Based on the foregoing, one or more metrics can be displayed on interface 1400, which is illustrated in FIG. 14. The proactive messaging service can determine, from responses across the group of potential customers, a response rate 1402, a success rate 1404, and an opt out rate 1406 associated with each message and/or campaign across the multiple messaging platforms (step 236). This can be done for each campaign, with information such as the campaign name 1408, channel 1410, recipients 1412, author 1414, skill 1416, launch date 1418, and status 1419. A new campaign 1420 can be defined and then included.

Figure 15:
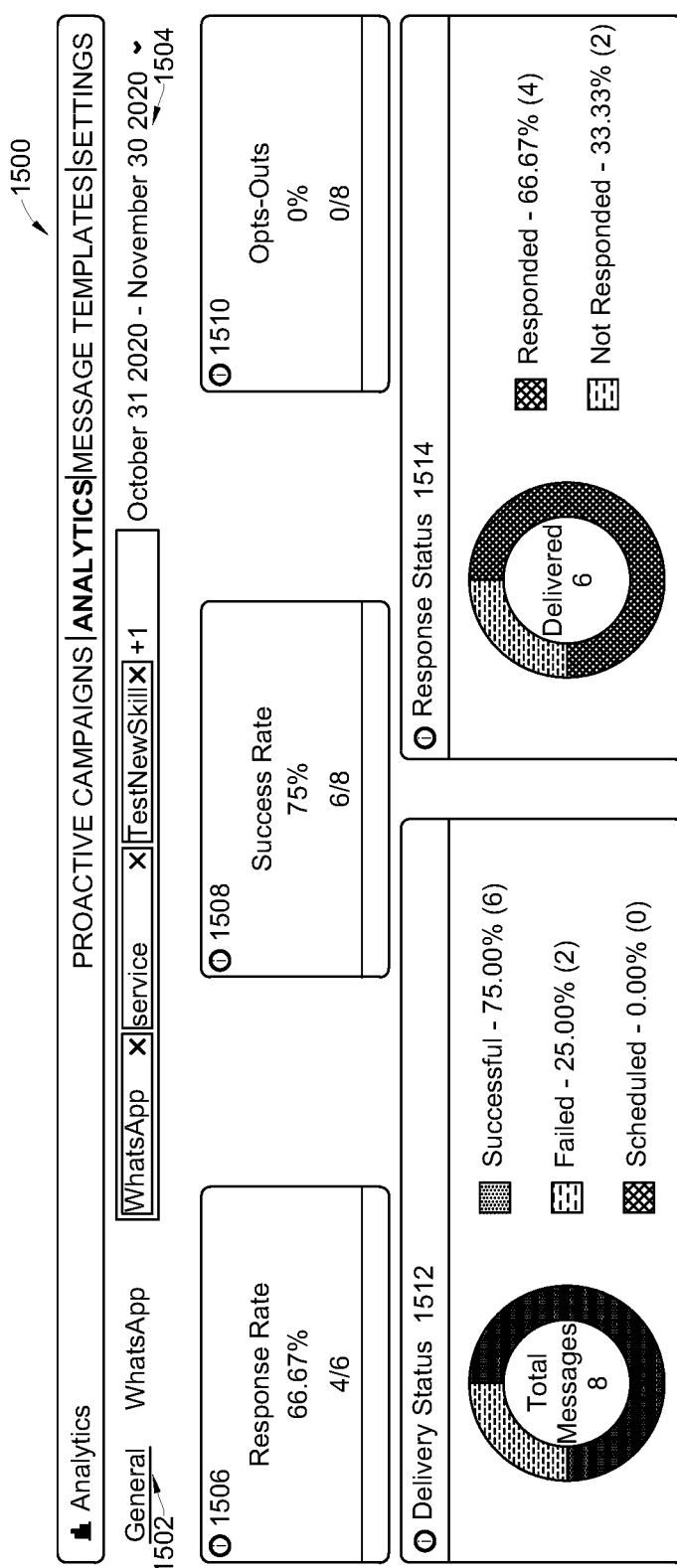
FIG. 15 shows a user interface for proactively sending a message in accordance with at least one embodiment.
Figure 16:
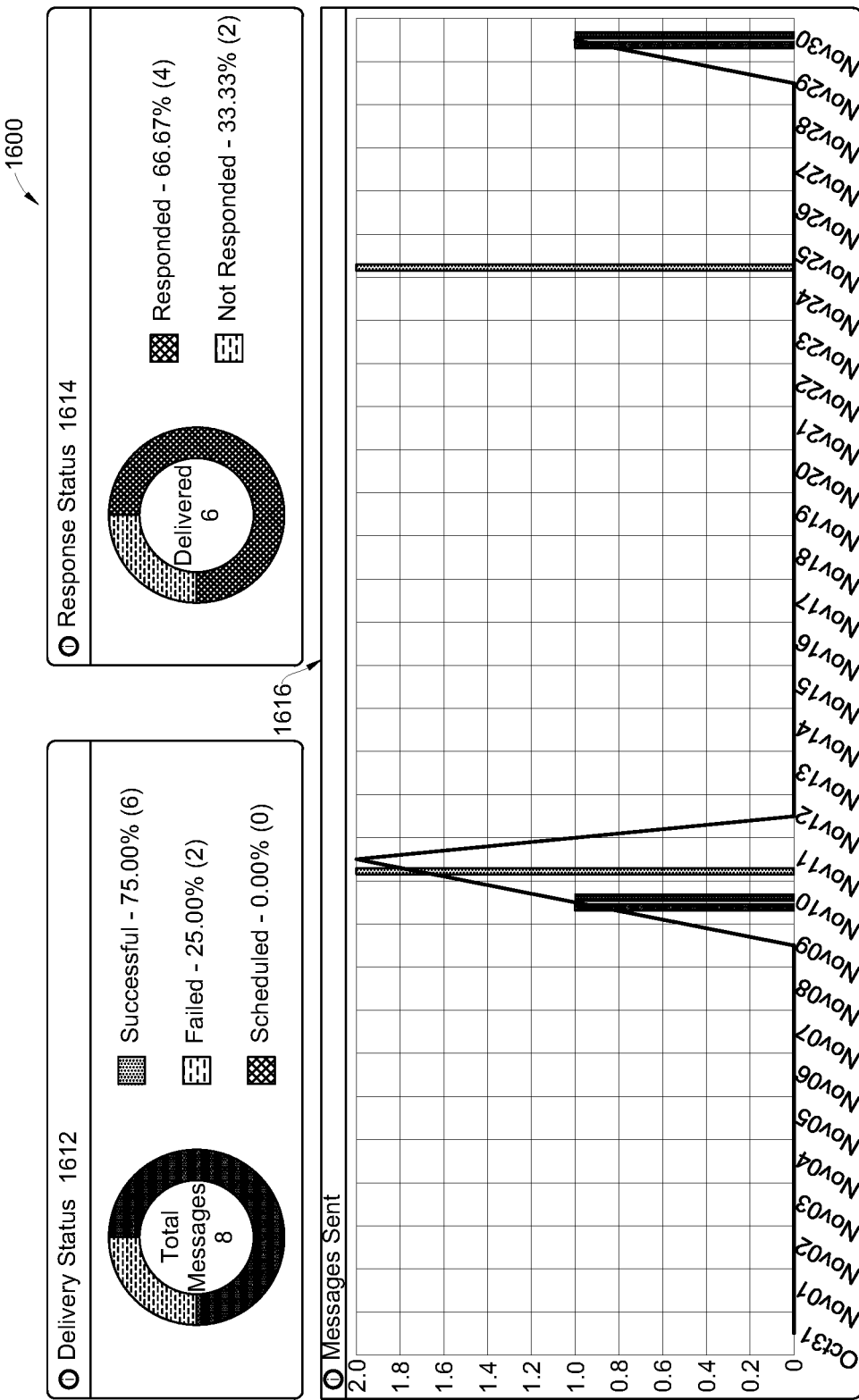
FIG. 16 shows a user interface for proactively sending a message in accordance with at least one embodiment

FIG. 15 illustrates example analytics interface 1500 based on one or more filters 1502. The proactive messaging service can determine, from responses across the group of potential customers, a response rate 1506, a success rate 1508, and an opt out rate 1510 associated with each message and/or campaign across the multiple messaging platforms based on the filters (in this case, filtered for WhatsApp messages for the service and new skill agent categories). A date range 1504 can be included for the analytics metrics. Other metrics can be shown, such as delivery status 1512 and response status 1514. FIG. 16 shows the breakdown of the delivery status 1612 and/or response status 1614 in bar chart form 1616.

In some embodiments, if the existing conversation is closed, a proactive message can be submitted and the conversation will reactivate. If the existing conversation is active, the proactive message cannot be submitted and the proactive campaign agent will be notified of such conversation.

When a customer does not have any active conversation and receives a proactive message and if the customer wants to engage with proactive message, they simply reply back and they will be directed to the right agent pool. If the customer does not want to engage with proactive message but has a different question, they can ask their question and it will go to the campaign skill and might need to be redirected to an appropriate agent based on what the customer is looking for. If the customer wants to go back to the proactive message AND the campaign is still active, they can ask about it and the agent will need to transfer them to the right person.

When the customer has an active conversation and receives a proactive message, they can simply reply back and they will be directed to the right agent pool. If a customer wants to continue their ongoing conversation, they can respond back. They can be directed to the relevant campaign skill (the agent may need to redirect). If the customer wants to go back to the proactive message AND the campaign is still active, they can ask about it and the agent will need to transfer them to the right person.

Figure 17:
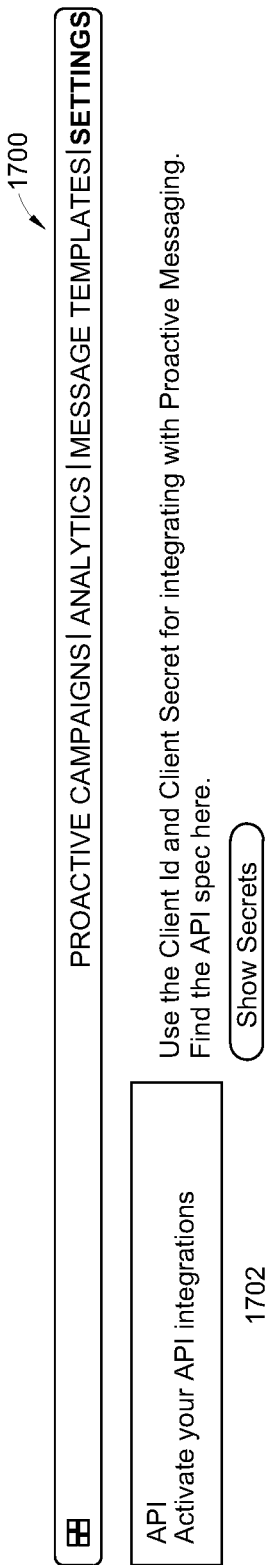
FIG. 17 shows a user interface for proactively sending a message in accordance with at least one embodiment.

FIG. 17 shows an example application programming interface (API) module 1700 that allows a brand to activate 1702 an API integration. In some embodiments, the API can integrate with third party software to initiate the conversation between the specific customer and the agent within the particular messaging platform. The API may then output to the third party software one or more reporting metrics based on the conversation.

Figure 18:
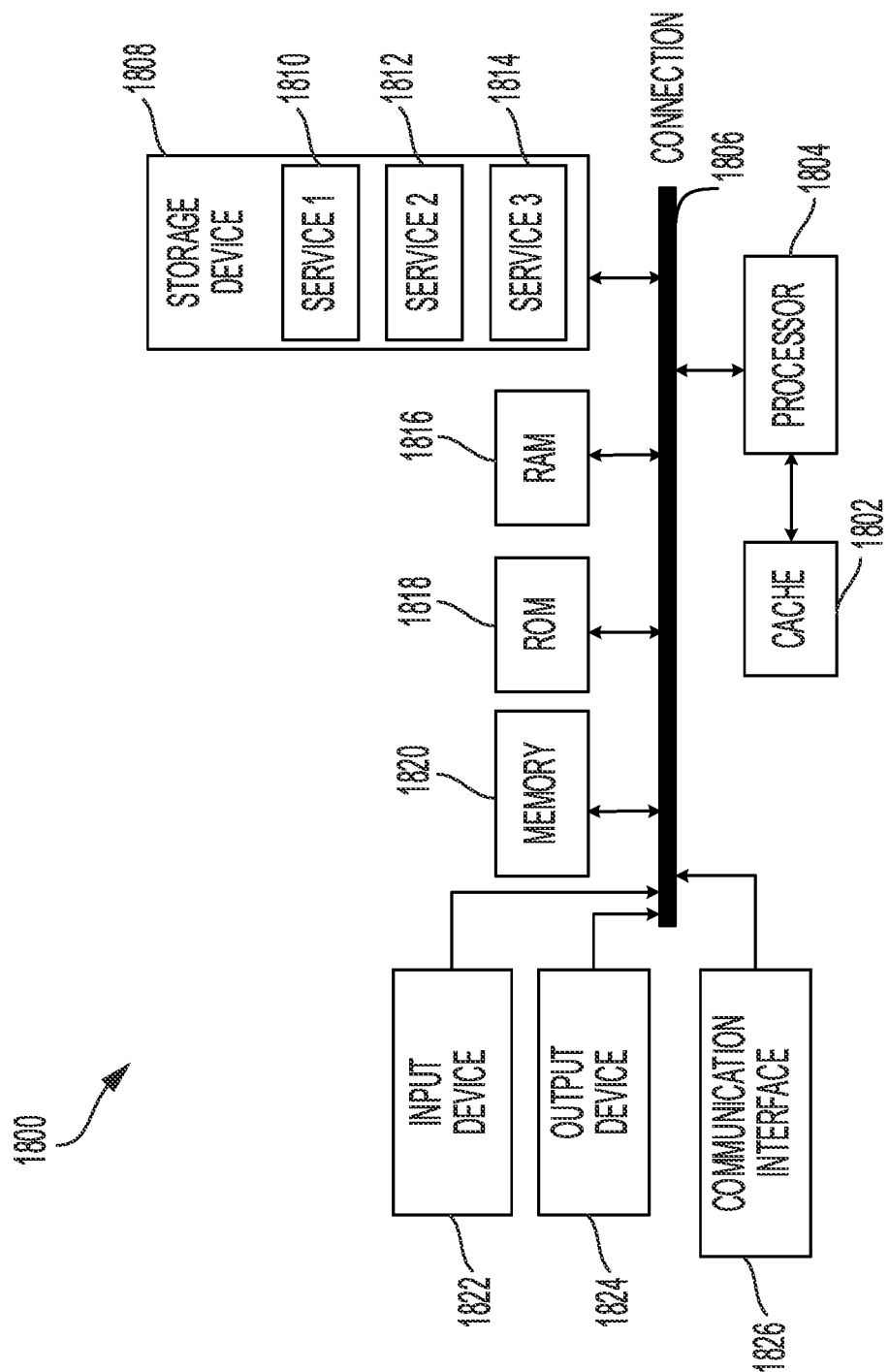
FIG. 18 shows an illustrative example of an environment in which various embodiments can be implemented.

FIG. 18 shows an example of computing system 1800 in which the components of the system are in communication with each other using connection 1805. Connection 1805 can be a physical connection via a bus, or a direct connection into processor 1810, such as in a chipset architecture. Connection 1805 can also be a virtual connection, networked connection, or logical connection.

In some embodiments computing system 1800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 1800 includes at least one processing unit (CPU or processor) 1810 and connection 1805 that couples various system components including system memory 1815, such as read only memory (ROM) and random access memory (RAM) to processor 1810. Computing system 1800 can include a cache of high-speed memory connected directly with, in close proximity to, or integrated as part of processor 1810.

Processor 1810 can include any general purpose processor and a hardware service or software service, such as services 1832, 1834, and 1836 stored in storage device 1830, configured to control processor 1810 as well as a special-purpose processor where software instructions are incorporated into the actual processor design. Processor 1810 may essentially be a completely self-contained computing system, containing multiple cores or processors, a bus, memory controller, cache, etc. A multi-core processor may be symmetric or asymmetric.

To enable user interaction, computing system 1800 includes an input device 1845, which can represent any number of input mechanisms, such as a microphone for speech, a touch-sensitive screen for gesture or graphical input, keyboard, mouse, motion input, speech, etc. Computing system 1800 can also include output device 1835, which can be one or more of a number of output mechanisms known to those of skill in the art. In some instances, multimodal systems can enable a user to provide multiple types of input/output to communicate with computing system 1800. Computing system 1800 can include communications interface 1840, which can generally govern and manage the user input and system output. There is no restriction on operating on any particular hardware arrangement and therefore the basic features here may easily be substituted for improved hardware or firmware arrangements as they are developed.

Storage device 1830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1830 can include software services, servers, services, etc., that when the code that defines such software is executed by the processor 1810, it causes the system to perform a function. In some embodiments, a hardware service that performs a particular function can include the software component stored in a computer-readable medium in connection with the necessary hardware components, such as processor 1810, connection 1805, output device 1835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:
1. A method, comprising:
proactively sending a message, wherein when the message is received, the message initiates a conversation with a user across a first messaging platform;
dynamically determining that the first messaging platform is unavailable;
dynamically generating a list of prioritized alternative messaging platforms based on determining that the first messaging platform is unavailable;

selecting a prioritized second messaging platform from the list of prioritized alternative messaging platforms;

dynamically modifying the message in accordance with standards associated with the prioritized second messaging platform;

receiving a response after sending the modified message, wherein when the response is received on the prioritized second messaging platform, an agent is selected from a pool of agents to respond, wherein the agent responds on the prioritized second messaging platform when the prioritized second messaging platform is available; and reprioritizing the pool of agents to respond on a real time basis when the list of prioritized alternative messaging platforms is reprioritized.

2. The method of claim 1, wherein determining that the first messaging platform is unavailable and generating the list of prioritized alternative messaging platforms is done on a real time basis.

3. The method of claim 1, the method further comprising:
receiving input at slidable elements on a user interface to define one or more time periods to send the message;
determining that the message will not be received at the first messaging platform within the one or more time periods; and
dynamically modifying the one or more time periods in accordance with when the first messaging platform is available.

4. The method of claim 1, the method further comprising defining a lookback period, wherein the message is designated as non-responsive when no response from the user is received within the lookback period.

5. The method of claim 1, further comprising:
displaying an option on a user interface for selecting a preferred messaging platform as the first messaging platform;
prioritizing the first messaging platform above other messaging platforms;
reprioritizing the list of prioritized alternative messaging platforms based on determining the first messaging platform is unavailable; and
in subsequent messages, dynamically lowering a prioritization of the first messaging platform based on a model that predicts unavailability of the first messaging platform.

6. The method of claim 1, further comprising:
displaying an option on a user interface to define a receiving window, wherein the receiving window defines a range of times in which the message can be proactively sent and wherein the receiving window excludes certain time periods; and
sending the message to a specific customer within the receiving window.

7. The method of claim 1 wherein a receiving window is defined on a real time basis.

8. The method of claim 1, further comprising:
determining that the response from a specific customer includes an opt out request; and
prohibiting future messages from being sent until the specific customer sends a request to opt in.

9. The method of claim 8, wherein the opt out request is determined on a real time basis through natural language processing.

10. The method of claim 1, further comprising:
determining, from responses across a group of potential customers, a response rate, a success rate, and an opt out rate associated with each message across two or more messaging platforms; and
displaying the response rate, the success rate, and the opt out rate on a user interface over a period of time.

11. The method of claim 1, wherein an application programming interface integrates with third party software to initiate the conversation between a specific customer and the agent within a particular messaging platform, and wherein an application programming interface outputs to the third party software one or more reporting metrics based on the conversation.

12. A computer-implemented system, comprising:
one or more processors; and
a non-transitory computer readable storage medium including instructions that, when executed by the one or more processors, cause the one or more processors to perform operations including:
proactively sending a message, wherein when the message is received, the message initiates a conversation with a user across a first messaging platform;
dynamically determining that the first messaging platform is unavailable;
dynamically generating a list of prioritized alternative messaging platforms based on determining that the first messaging platform is unavailable;
selecting a prioritized second messaging platform from the list of prioritized alternative messaging platforms;
dynamically modifying the message in accordance with standards associated with the prioritized second messaging platform;
receiving a response after sending the modified message, wherein when the response is received on the prioritized second messaging platform, an agent is selected from a pool of agents to respond, wherein the agent responds on the prioritized second messaging platform when the prioritized second messaging platform is available; and
reprioritizing the pool of agents to respond on a real time basis when the list of prioritized alternative messaging platforms is reprioritized.

13. The computer-implemented system of claim 12, wherein determining that the first messaging platform is unavailable and generating the list of prioritized alternative messaging platforms is done on a real time basis.

14. The computer-implemented system of claim 12, wherein the operations further include:
receiving input at slidable elements on a user interface to define one or more time periods to send the message;
determining that the message will not be received at the first messaging platform within the one or more time periods; and
dynamically modifying the one or more time periods in accordance with when the first messaging platform is available.

15. The computer-implemented system of claim 12, wherein the operations further include:
displaying an option on a user interface for selecting a preferred messaging platform as the first messaging platform;
prioritizing the first messaging platform above other messaging platforms;
reprioritizing the list of prioritized alternative messaging platforms based on determining the first messaging platform is unavailable; and in subsequent messages, dynamically lowering a prioritization of the first messaging platform based on a model that predicts unavailability of the first messaging platform.

16. A non-transitory computer readable storage medium comprising instructions that, when executed by one or more processors, cause the one or more processors to perform operations including:
   proactively sending a message, wherein when the message is received, the message initiates a conversation with a user across a first messaging platform;
   dynamically determining that the first messaging platform is unavailable;
   dynamically generating a list of prioritized alternative messaging platforms based on determining that the first messaging platform is unavailable;
   selecting a prioritized second messaging platform from the list of prioritized alternative messaging platforms;
   dynamically modifying the message in accordance with standards associated with the prioritized second messaging platform;
   receiving a response after sending the modified message, wherein when the response is received on the prioritized second messaging platform, an agent is selected from a pool of agents to respond, wherein the agent responds on the prioritized second messaging platform when the prioritized second messaging platform is available; and
   reprioritizing the pool of agents to respond on a real time basis when the list of prioritized alternative messaging platforms is reprioritized.

17. The non-transitory computer readable storage medium of claim 16, wherein determining that the first messaging platform is unavailable and generating the list of prioritized alternative messaging platforms is done on a real time basis.

18. The non-transitory computer readable storage medium of claim 16, wherein the operations further include:
   receiving input at slidable elements on a user interface to define one or more time periods to send the message;
   determining that the message will not be received at the first messaging platform within the one or more time periods; and
   dynamically modifying the one or more time periods in accordance with when the first messaging platform is available.

19. The non-transitory computer readable storage medium of claim 16, wherein the operations further include:
   displaying an option on a user interface for selecting a preferred messaging platform as the first messaging platform;
   prioritizing the first messaging platform above other messaging platforms;
   reprioritizing the list of prioritized alternative messaging platforms based on determining the first messaging platform is unavailable; and
   in subsequent messages, dynamically lowering a prioritization of the first messaging platform based on a model that predicts unavailability of the first messaging platform.

20. The computer-implemented system of claim 12, wherein the one or more processors further perform operations including:
   defining a lookback period, wherein the message is designated as non-responsive when no response from the user is received within the lookback period.

21. The computer-implemented system of claim 12, wherein the one or more processors further perform operations including:
   displaying an option on a user interface to define a receiving window, wherein the receiving window defines a range of times in which the message can be proactively sent and wherein the receiving window excludes certain time periods; and
   sending the message to a specific customer within the receiving window.

22. The computer-implemented system of claim 12, wherein a receiving window is defined on a real time basis.

23. The computer-implemented system of claim 12, wherein the one or more processors further perform operations including:
   determining that the response from a specific customer includes an opt out request; and
   prohibiting future messages from being sent until the specific customer sends a request to opt in.

24. The computer-implemented system of claim 23, wherein the opt out request is determined on a real time basis through natural language processing.

25. The computer-implemented system of claim 12, wherein the one or more processors further perform operations including:
   determining, from responses across a group of potential customers, a response rate, a success rate, and an opt out rate associated with each message across two or more messaging platforms; and
   displaying the response rate, the success rate, and the opt out rate on a user interface over a period of time.

26. The computer-implemented system of claim 12, wherein an application programming interface integrates with third party software to initiate the conversation between a specific customer and the agent within a particular messaging platform, and wherein an application programming interface outputs to the third party software one or more reporting metrics based on the conversation.

27. The non-transitory computer readable storage medium of claim 16, wherein the operations further include:
   defining a lookback period, wherein the message is designated as non-responsive when no response from the user is received within the lookback period.

28. The non-transitory computer readable storage medium of claim 16, wherein the one or more processors further perform operations including:
   displaying an option on a user interface to define a receiving window, wherein the receiving window defines a range of times in which the message can be proactively sent and wherein the receiving window excludes certain time periods; and
   sending the message to a specific customer within the receiving window.

29. The non-transitory computer readable storage medium of claim 16, wherein a receiving window is defined on a real time basis.

30. The non-transitory computer readable storage medium of claim 16, wherein the operations further include:
   determining that the response from a specific customer includes an opt out request; and
   prohibiting future messages from being sent until the specific customer sends a request to opt in.

31. The non-transitory computer readable storage medium of claim 30, wherein the opt out request is determined on a real time basis through natural language processing.

32. The non-transitory computer readable storage medium of claim 16, wherein the operations further include:

determining, from responses across a group of potential customers, a response rate, a success rate, and an opt out rate associated with each message across two or more messaging platforms; and displaying the response rate, the success rate, and the opt out rate on a user interface over a period of time.

33. The non-transitory computer readable storage medium of claim 16, wherein an application programming interface integrates with third party software to initiate the conversation between a specific customer and the agent within a particular messaging platform, and wherein an application programming interface outputs to the third party software one or more reporting metrics based on the conversation.

\* \* \* \* \*